United States Patent
Kim et al.

(10) Patent No.: US 10,299,210 B2
(45) Date of Patent: May 21, 2019

(54) METHOD AND APPARATUS FOR REDUCING POWER CONSUMPTION OF ELECTRONIC DEVICE

(71) Applicant: SAMSUNG ELECTRONICS CO., LTD., Suwon-si, Gyeonggi-do (KR)

(72) Inventors: Jinkyu Kim, Daegu (KR); Jinhong Seol, Gumi-si (KR); Mangun Hur, Daegu (KR); Jongphil Lee, Daegu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 212 days.

(21) Appl. No.: 15/001,457

(22) Filed: Jan. 20, 2016

(65) Prior Publication Data
US 2016/0212708 A1    Jul. 21, 2016

(30) Foreign Application Priority Data
Jan. 21, 2015 (KR) .................. 10-2015-0009930

(51) Int. Cl.
*H04W 52/02* (2009.01)
*H04W 60/04* (2009.01)

(52) U.S. Cl.
CPC ... *H04W 52/0229* (2013.01); *H04W 52/0216* (2013.01); *Y02D 70/1242* (2018.01);
(Continued)

(58) Field of Classification Search
None
See application file for complete search history.

(56) References Cited

U.S. PATENT DOCUMENTS

2009/0312073 A1* 12/2009 Park ............. H04W 52/0216
                                                       455/574
2010/0046451 A1*  2/2010 Tada ................ H04W 4/10
                                                       370/329

(Continued)

FOREIGN PATENT DOCUMENTS

KR    10-2010-0071621    6/2010

OTHER PUBLICATIONS

Universal Mobile Telecommunications System (UMTS): Requirements for support of radio resource management (FDD), ETSI TS 125 133 V11.9.0, Jul. 2014, 351 pages.

*Primary Examiner* — Lonnie V Sweet
(74) *Attorney, Agent, or Firm* — Nixon & Vanderhye P.C.

(57) ABSTRACT

A method, an apparatus, and a system are disclosed, which can reduce power consumption of an electronic device by allowing a communication relay device, to which the electronic device is connected, to perform an operation of the electronic device corresponding to waking up from a sleep mode according to a system timer cycle to identify paging and performing channel monitoring on behalf of the electronic device. A method of reducing power consumption of an electronic device may include: making a connection between the electronic device and a communication relay device; transmitting forwarding information to the communication relay device in response to the connection with the communication relay device by the electronic device; notifying of entry into a sleep mode to the communication relay device and entering the sleep mode by the electronic device; performing channel monitoring for the electronic device in response to the notification of the entry of the electronic device into the sleep mode by the communication relay device; waking up the electronic device when detecting paging corresponding to the electronic device by the communication relay device; and processing the paging in
(Continued)

response to the waking-up of the communication relay device by the electronic device.

18 Claims, 14 Drawing Sheets

(52) U.S. Cl.
CPC ...... *Y02D 70/1244* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/24* (2018.01); *Y02D 70/26* (2018.01)

(56) References Cited

U.S. PATENT DOCUMENTS

| | | | | |
|---|---|---|---|---|
| 2010/0177672 A1* | 7/2010 | Dayal | .................. | H04W 52/46 370/311 |
| 2012/0027025 A1* | 2/2012 | Bekiares | ................ | H04L 47/745 370/431 |
| 2012/0214502 A1* | 8/2012 | Qiang | ..................... | H04W 8/12 455/453 |
| 2013/0044674 A1* | 2/2013 | Teyeb | ................ | H04B 7/15542 370/315 |
| 2013/0176890 A1* | 7/2013 | Sharma | .............. | H04B 7/15557 370/252 |
| 2013/0187756 A1* | 7/2013 | Fisher | ................ | G07C 9/00571 340/5.61 |
| 2013/0294314 A1* | 11/2013 | Lee | ....................... | H04W 48/18 370/311 |
| 2015/0365859 A1* | 12/2015 | Dalsgaard | ......... | H04W 36/0088 370/331 |
| 2016/0049102 A1* | 2/2016 | Lee | ........................ | G06Q 30/02 340/10.51 |
| 2016/0142974 A1* | 5/2016 | Lindoff | .................... | H04B 1/40 370/311 |

\* cited by examiner

METHOD AND APPARATUS FOR REDUCING POWER CONSUMPTION OF ELECTRONIC DEVICE

CROSS-REFERENCE TO RELATED APPLICATION

This application is based on and claims priority under 35 U.S.C. § 119 to Korean Application Serial No. 10-2015-0009930, which was filed in the Korean Intellectual Property Office on Jan. 21, 2015, the disclosure of which is incorporated by reference herein in its entirety.

TECHNICAL FIELD

The disclosure relates generally to a method and an apparatus for reducing power consumption of an electronic device, which can reduce power consumed by, for example, periodic wake-up of the electronic device for communication with a network.

BACKGROUND

In recent years, with the development of wireless technologies, wired networks used by many people have been replaced with wireless networks. That is, since mobility problems with wired networks were able to be solved using the wireless technology, studies on a variety of technologies using the wireless networks have been increasingly conducted. Particularly, among the technologies using the wireless networks in various ways, a technology using a mobile communication network for a mobile communication service, a technology using a local network for a Wireless Local Area Network (WLAN) service, a technologies using a Wireless Personal Area Network (WPAN) for a short-range communication service, and a technology for linking various types of wireless networks are being actively researched.

Even though the local network or the wireless personal communication network has been rapidly spread due to a relatively high service speed and low service cost, the network has disadvantages of providing a narrow service area and low mobility. However, the mobile communication network has a low service speed and a high cost, but has advantages of supporting a wide service area and high mobility.

For this reason, a mobile convergence technology for combining various types of wireless networks to allow them to interwork with each other has been recently developed. Further, an electronic device (for example, a multi-mode mobile terminal), which supports a multi-Radio Access Technology (RAT) by which the electronic device can access all of two or more types of wireless networks is being developed. The mobile communication network may include networks supporting a communication scheme such as a Global System for Mobile telecommunication (GSM), a Universal Mobile Telecommunication System (UMTS), International Mobile Telecommunications-2000 (IMT-2000), Code Division Multiple access (CDMA), Wideband CDMA (WCDMA), and the like. The local network may include networks supporting a communication scheme such as Wi-Fi, Worldwide interoperability for Microwave access (WiMAX), and the like. The wireless personal communication network may include networks supporting a communication scheme such as Bluetooth, Zigbee, Ultra WideBand (UWB), and the like.

Meanwhile, the electronic device may enter a sleep mode in a state where the electronic device is connected to the mobile communication network. For example, when the electronic device does not operate for a predetermined time due to the use of a restricted battery, the electronic device enters a sleep mode to increase a usable time. The sleep mode refers to a mode for switching a hardware module of the electronic device to a sleep state, and the electronic device may enter the sleep mode, wake up the hardware module on a configured cycle, maintain an active mode for a predetermined time, and switch back to the sleep mode after the predetermined time elapses. The electronic device may perform a system timer-related operation (for example, an operation according to a Discontinuous Reception (DRX) cycle) in the sleep mode. The system timer (for example, the DRX cycle)-related operation is used to reduce consumption of the electronic device, that is, a technology to reduce power consumption by turning off a part related to reception when the electronic device does not receive data from a network and turning on the reception part only when necessary. In general, the electronic device may operate a low power or sleep mode for a predetermined time and operate after switching a total power or active mode for another predetermined time in order to reduce battery consumption. For example, the mobile communication network may process the reception-related operation by turning on the reception part every system timer cycle (for example, the DRX cycle). Accordingly, the electronic device periodically wakes up in the sleep mode due to the system timer. The system timer may vary depending on a service provider's network and, in general, the electronic device wakes up every 100 ms. Accordingly, the electronic device should periodically wake up and generate minimum current consumption in the lower power mode. Further, when the electronic device maintains a wake-up state by force for a predetermined time after entering the sleep mode, current consumption in the unit of dozens of mA may be generated and, finally, a use time of the electronic device may be reduced.

SUMMARY

The system timer itself corresponds to a technology for reducing power consumption, but the electronic device has to periodically perform monitoring (paging indicator) to identify paging from the network. Accordingly, the electronic device must turn on a reception part every paging occasion to repeatedly perform an operation of reading periodic information (for example, frame information) from the network and power consumption may be generated during such an operation. Further, variations in current consumption are generated according to a bouncing height of a current waveform during a waking-up interval, in which the operation is performed, and the waking-up interval, which influences the performance of a battery of the electronic device.

Various example embodiments of the disclosure may provide an electronic device and an operation method thereof which can reduce power consumption of the electronic device.

Various example embodiments of the disclosure provide an electronic device and an operation method thereof, which allow a communication relay device (for example, an Access Point (AP) or a host device), to which the electronic device is connected, to perform an operation of the electronic device on behalf of the electronic device. The operation being performed on behalf of the electronic device may, for example, correspond to periodically waking up from a sleep mode according to a system timer cycle (for example, a Discontinuous Reception (DRX) cycle) and monitoring a channel (for example, a paging channel).

Various example embodiments of the disclosure provide an electronic device and an operation method thereof, which allow a communication relay device (for example, an access point or a host device), to which the electronic device is connected for a second network (for example, a local area network or a personal area network) to perform an operation of the electronic device on behalf of the electronic device, so that electronic device may continuously maintain the sleep mode until paging is generated and thereby power consumption of the electronic device may be reduced. The operation being performed on behalf of the electronic device may, for example, correspond to periodically waking up from a sleep mode to identify paging with a first network (for example, a mobile communication network) and performing channel monitoring.

Various example embodiments of the disclosure may provide an electronic device and an operation method thereof, which may improve the user convenience and the usability of the electronic device by implementing an improved and/or optimal environment for reducing power consumption of the electronic device.

In accordance with an example of the disclosure, an electronic device is provided. The electronic device includes: a wireless communication module comprising wireless communication circuitry configured to communicate with a communication relay device; a mobile communication module comprising mobile communication circuitry configured to communicate with a service provider network; and a processor comprising processing circuitry functionally connected to the wireless communication module and the mobile communication module, wherein the processor is configured to maintain a sleep mode in a system timer cycle when the electronic device is in the sleep mode in a state where the electronic device is connected to the communication relay device, to wake up from the sleep mode when data of the service provider network is forwarded from the communication relay device to the electronic device, and to process an operation related to the data with the service provider network.

In accordance with another example of the disclosure, a communication relay device is provided. The communication relay device includes: a wireless communication module comprising wireless communication circuitry configured to communicate with an electronic device; a mobile communication module comprising mobile communication circuitry configured to communicate with a service provider network; and a processor comprising processing circuitry functionally connected to the wireless communication network and the mobile communication module, wherein the processor is configured to receive and register forwarding information of the electronic device and to perform channel monitoring corresponding to the electronic device based on the forwarding information in response to a sleep mode entering notification of the electronic device.

In accordance with another example of the disclosure, a system is provided. The system includes: a service provider network configured to provide a mobile communication system, to poll an electronic device according to a system timer cycle, and to broadcast a paging message to the electronic device as a destination; the electronic device configured to communicate with the service provider network, to provide information to a communication relay when the electronic device enters a sleep mode in a state where the electronic device is connected to the communication relay device, the information including information for channel monitoring of a communication relay device corresponding to the polling of the service provider network, the electronic device further configured to maintain the sleep mode in the system timer cycle when the electronic device is in the sleep mode, to wake up from the sleep mode when data of the service provider network is forwarded by the communication relay device, and to process an operation related to the data; and the communication relay device configured to make a connection to the electronic device, to form a channel with the service provider network based on information of the electronic device, to perform channel monitoring corresponding to the electronic device when the electronic device is in the sleep mode, and to forward the data to the electronic device to control the electronic device to be woken up when the data for the electronic device is detected based on the channel monitoring.

In accordance with another example of the disclosure, an operation method of an electronic device is provided. The method includes: making a connection between the electronic device a communication relay device; transmitting forwarding information from the electronic device to the communication relay device in response to the connection with the communication relay device; entering a sleep mode; waking up from the sleep mode in response to a control of the communication relay device; and processing a paging in response to waking-up from the sleep mode.

In accordance with another example of the disclosure, an operation method of a communication relay device is provided. The operation method includes: receiving forwarding information from a connected electronic device and storing the forwarding information; performing channel monitoring of the electronic device based on the forwarding information in response to a notification of the electronic device that the electronic device has entered into the sleep mode; and controlling the waking-up of the electronic device when paging corresponding to the electronic device is detected by the communication relay device.

In accordance with another example of the disclosure, an operation method of a system is provided. The operation method includes: making a connection between the electronic device and a communication relay device; transmitting forwarding information from the electronic device to the communication relay device in response to the connection with the communication relay device; notifying the communication relay of entry of the electronic device into a sleep mode and entering the sleep mode by the electronic device; performing channel monitoring for the electronic device in response to the notification of the entry of the electronic device into the sleep mode by the communication relay device; waking up the electronic device when detecting paging corresponding to the electronic device by the communication relay device; and processing the paging in response to the waking-up of the electronic device by the communication relay device.

In order to address and/or overcome the technical problem noted above, various example embodiments of the disclosure may include a computer-readable recording medium having a program recorded therein to perform the method by a processor.

A recording medium according to various example embodiments of the disclosure may include a computer-readable recording medium having a program recorded therein to execute an operation of connecting an electronic device to a communication relay device, and an operation of performing channel monitoring according to a system timer cycle of the electronic device by the communication relay device on behalf of the electronic device.

BRIEF DESCRIPTION OF THE DRAWINGS

The above and other aspects, features, and advantages of the disclosure will be more apparent from the following detailed description, taken in conjunction with the accompanying drawings, in which like reference numerals refer to like elements, and wherein.

DETAILED DESCRIPTION

Figure 1:
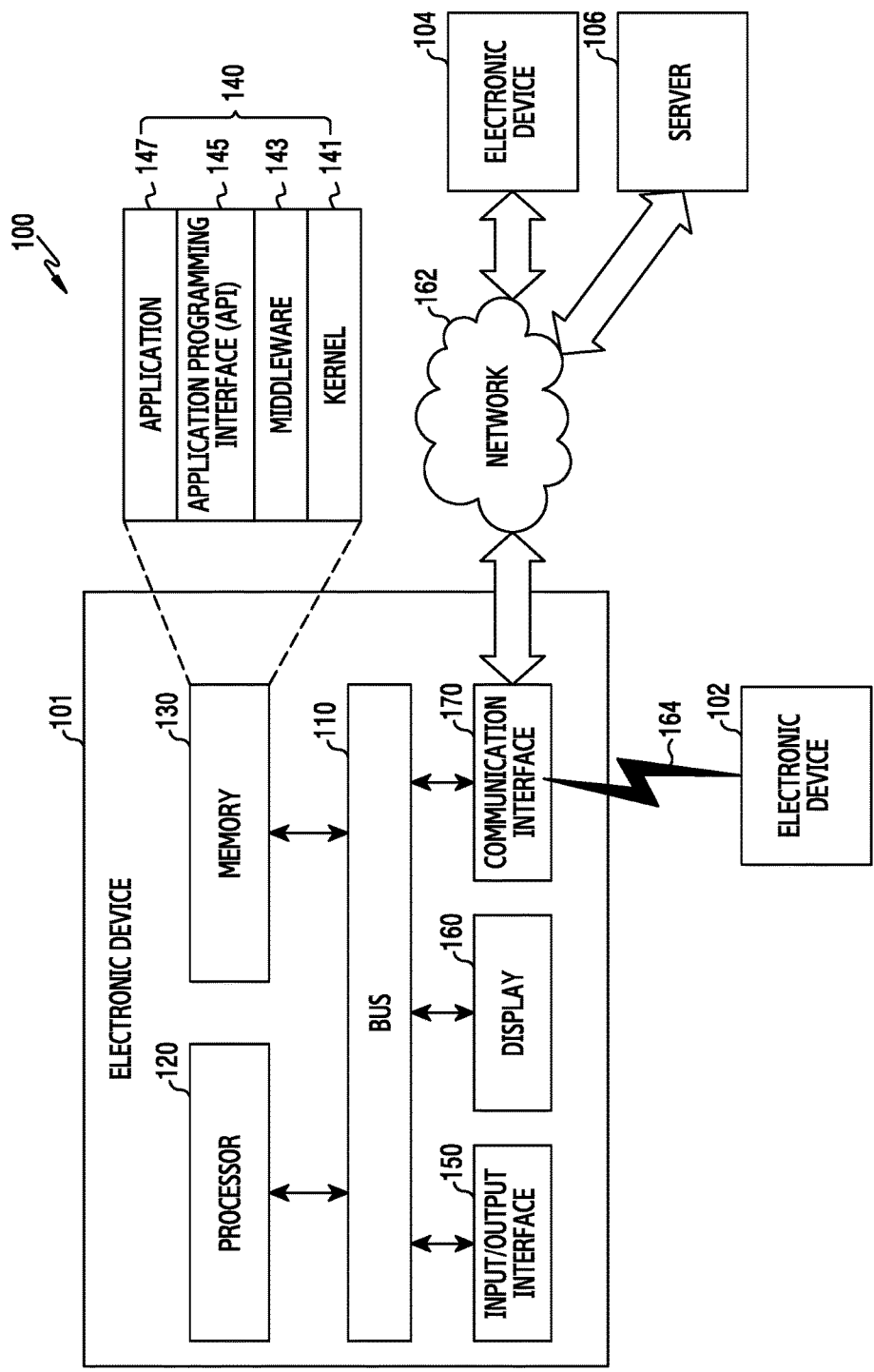
FIG. 1 is a block diagram illustrating an example network environment including an electronic device.

Hereinafter, various example embodiments of the disclosure will be described with reference to the accompanying drawings. However, it should be understood that there is no intent to limit the disclosure to the particular examples disclosed herein; rather, the disclosure should be construed to cover various modifications, equivalents, and/or alternatives of example embodiments of the disclosure. In describing the drawings, similar reference numerals may be used to designate similar constituent elements.

As used herein, the expression "have", "may have", "include", or "may include" refers, for example, to the existence of a corresponding feature (e.g., numeral, function, operation, or constituent element such as component), and does not exclude one or more additional features.

In the disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various example embodiments of the disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly or indirectly connected or coupled directly to the other element or any other element (e.g., third element) may be interposed between them. It may be understood that when an element (e.g., first element) is referred to as being "directly connected," or "directly coupled" to another element (second element), there is no other element (e.g., third element) interposed between them.

The expression "configured to" used in the disclosure may be exchanged with, for example, "suitable for", "having the capacity to", "designed to", "adapted to", "made to", or "capable of" according to the situation. The term "configured to" may not necessarily imply "specifically designed to" in hardware. In some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., central processing unit (CPU) or application processor (AP)) that can perform the corresponding operations by executing one or more software programs stored in a memory device.

The terms used in the disclosure are only used to describe example embodiments, and are not intended to limit the disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equivalent to the contextual meanings in the relevant field of art, and are not to be interpreted to have ideal or excessively formal meanings unless clearly defined in the disclosure. In some cases, even if the term is defined in the disclosure, it should not be interpreted to exclude embodiments of the disclosure.

An electronic device according to various example embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like. According to various example embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like.

According to some example embodiments, the electronic device may, for example, be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like.

According to another example embodiment, the electronic device may include, for example, at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like.

According to some example embodiments, the electronic device may include, for example, at least one of a part of furniture or a building/structure, an electronic board, an electronic signature receiving device, a projector, and various kinds of measuring instruments (e.g., a water meter, an electric meter, a gas meter, and a radio wave meter), or the like. The electronic device according to various example embodiments of the disclosure may be a combination of one or more of the aforementioned various devices. The electronic device according to some example embodiments of the disclosure may be a flexible device. Further, the electronic device according to an example embodiment of the disclosure is not limited to the aforementioned devices, and may include a new electronic device according to the development of technology.

Hereinafter, an electronic device according to various example embodiments will be described with reference to the accompanying drawings. As used herein, the term "user" may indicate a person who uses an electronic device or a device (e.g., an artificial intelligence electronic device) that uses an electronic device.

FIG. 1 is a block diagram illustrating an example network environment including an electronic device.

An electronic device 101 within a network environment 100, according to various example embodiments, will be described with reference to FIG. 1. The electronic device 101 may include a bus 110, a processor (e.g., including processing circuitry) 120, a memory 130, an input/output interface (e.g., including input/output circuitry) 150, a display (e.g., including a display panel) 160, and a communication interface (e.g., including communication circuitry) 170. According to an example embodiment of the disclosure, the electronic device 101 may omit at least one of the above components or may further include other components.

The bus 110 may include, for example, circuitry which interconnects the components 110 to 170 and delivers a communication (e.g., a control message and/or data) between the components 110 to 170.

The processor 120 may include one or more of a Central Processing Unit (CPU), an Application Processor (AP), and a Communication Processor (CP). The processor 120 may be configured to carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an example embodiment of the disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

The middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input by a user or from another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106, etc.). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS), or the like. The network 162 may include at least one of a telecommunication network such as a computer network (e.g., a LAN or a WAN), the Internet, and a telephone network, or the like.

Each of the first and second external electronic devices 102 and 104 may, for example, be of a type identical to or different from that of the electronic device 101. According to an example embodiment of the disclosure, the server 106 may include a group of one or more servers. According to various example embodiments of the disclosure, all or some of the operations performed in the electronic device 101 may be executed in another electronic device or a plurality of electronic devices (e.g., the electronic devices 102 and 104 or the server 106). According to an example embodiment of the disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. For example, cloud computing, distributed computing, or client-server computing technologies, or the like, may be used.

Figure 2:
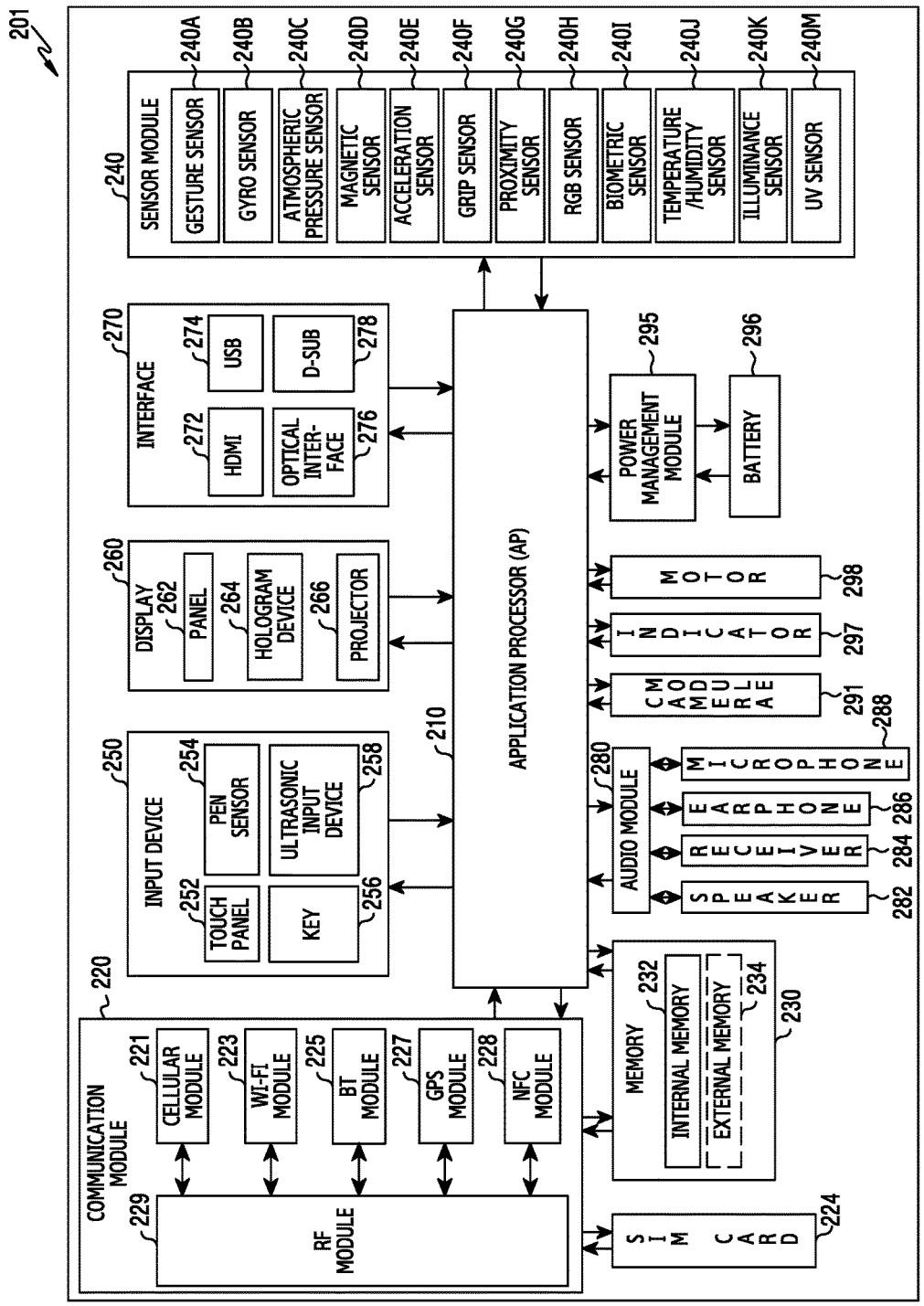
FIG. 2 is a block diagram illustrating an example electronic device.

FIG. 2 is a block diagram illustrating an example electronic device.

The electronic device 201 may include, for example, all or a part of the electronic device 101 shown in FIG. 1. The electronic device 201 may include, for example, one or more processors (e.g., including processing circuitry) 210 (e.g., Application Processors (AP)), a communication module (e.g., including communication circuitry) 220, a Subscriber Identification Module (SIM) 224, a memory 230, a sensor module (e.g., including sensor circuitry and/or sensors) 240, an input device (e.g., including input circuitry) 250, a display (e.g., including a display panel) 260, an interface (e.g., including interface circuitry) 270, an audio module (e.g., including audio processing circuitry) 280, a camera module 291, a power management module 295, a battery 296, an indicator 297, and a motor 298.

The processor 210 may be configured to control a plurality of hardware or software components connected to the processor 210 by driving an operating system or an application program, and to perform processing of various pieces of data and calculations. The processor 210 may, for example, be embodied as, for example, a System on Chip (SoC), processing circuitry, etc. According to an example embodiment of the disclosure, the processor 210 may further include a Graphic Processing Unit (GPU) and/or an image signal processor. The processor 210 may include, for example, at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration that is the same as or similar to that of the communication interface 170 of FIG. 1. The communication module 220 may include, for example, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an example embodiment of the disclosure, the cellular module 221 may distinguish and authenticate the electronic device 201 in a communication network using the subscriber identification module 224 (for example, the SIM card). According to an example embodiment of the disclosure, the cellular module 221 may perform at least some of the functions that the AP 210 may provide. According to an example embodiment of the disclosure, the cellular module 221 may include a communication processor (CP).

For example, each of the Wi-Fi module 223, the BT module 225, the GNSS module 227, and the NFC module 228 may include a processor (e.g., including processing circuitry) for processing data transmitted/received through a corresponding module. According to an example embodiment of the disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another example embodiment of the disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an example embodiment of the disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include, for example, a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an example embodiment of the disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 may, for example, be a device which may photograph a still image and a video. According to an example embodiment of the disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an example embodiment of the disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the disclosure may be configured with one or more components, and the names of the corresponding component elements may vary based on the type of electronic device. In various example embodiments, the electronic device may include at least one of the above-described elements. Some of the above-described elements may be omitted from the electronic device, or the electronic device may further include additional elements. Also, some of the hardware components according to various example embodiments may be combined into one entity, which may perform functions identical to those of the relevant components before the combination.

Figure 3:
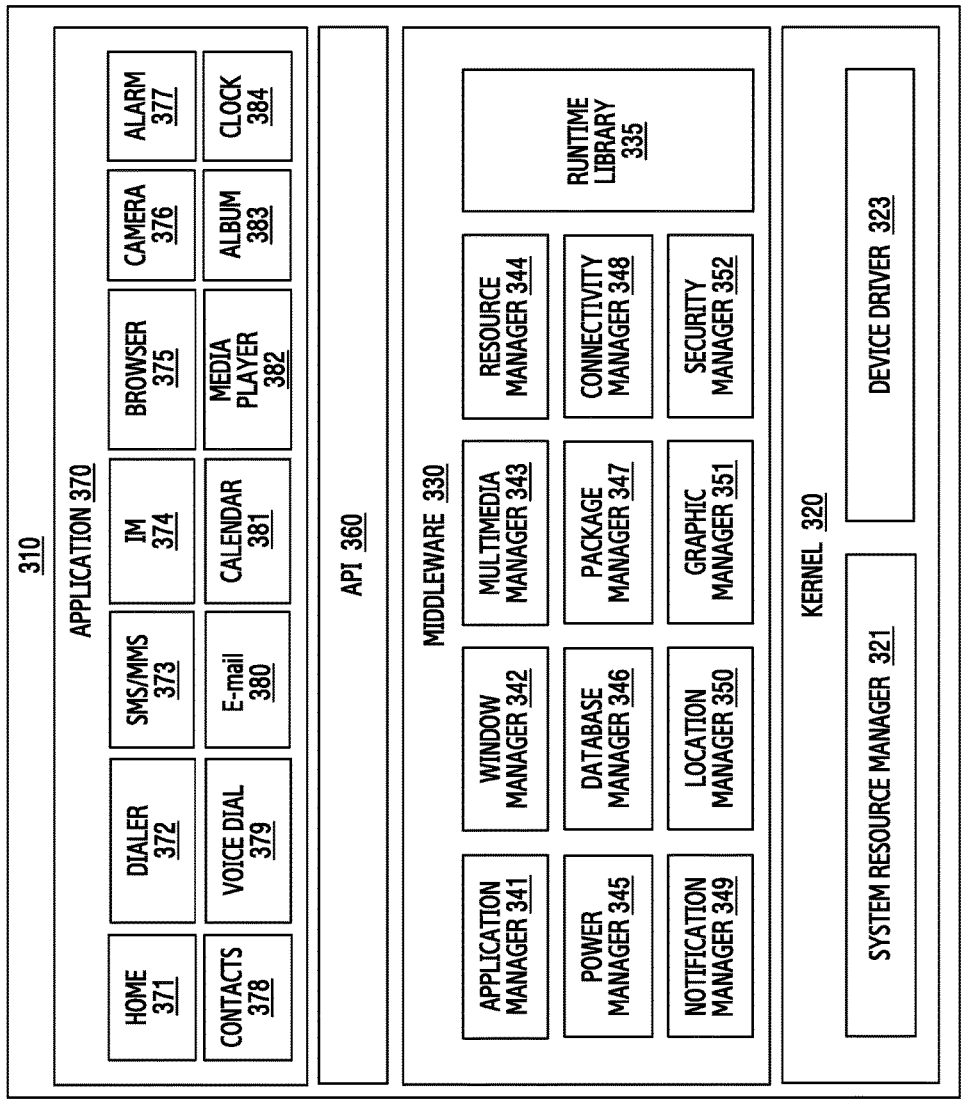
FIG. 3 is a block diagram illustrating an example program module.

FIG. 3 is a block diagram illustrating an example program module.

According to an example embodiment of the disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android, iOS, Windows, Symbian, Tizen, Bada, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may, for example, control, allocate, or collect system resources. According to an example embodiment of the disclosure, the system resource manager 321 may include, for example, a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an example embodiment of the disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an example embodiment of the disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) may, for example, refer to a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an example embodiment of the disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an example embodiment of the disclosure, the applications 370 may include applications (e.g., a health care application of a mobile medical appliance or the like) designated according to an external electronic device (e.g., attributes of the electronic device 102 or 104). According to an example embodiment of the disclosure, the applications 370 may include an application received from an external electronic device (e.g., the server 106, or the electronic device 102 or 104). According to an example embodiment of the disclosure, the applications 370 may include a preloaded application or a third party application that may be downloaded from a server. The names of the components of the program module 310 of the illustrated example embodiment of the disclosure may change according to the type of operating system.

According to various example embodiments, at least a part of the programming module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of hardware circuitry, firmware, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recording medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

Any of the modules or programming modules according to various example embodiments of the disclosure may include at least one of the above described elements, exclude some of the elements, or further include other additional elements. The operations performed by the modules, programming module, or other elements according to various example embodiments of the disclosure may be executed in a sequential, parallel, repetitive, or heuristic manner. Further, some operations may be executed according to another order or may be omitted, or other operations may be added. Various example embodiments disclosed herein are provided merely to easily describe technical details of the disclosure and to aid the understanding of the disclosure, and are not intended to limit the scope of the disclosure. Therefore, it should be construed that all modifications and changes or modified and changed forms based on the technical idea of the disclosure fall within the scope of the disclosure.

Various example embodiments of the disclosure relate, for example, to an electronic device including a communication function and an operation method thereof. Various example embodiments of the disclosure provide an electronic device and an operation method thereof, which allow a communication relay device (for example, an Access Point (AP) or a host device), to which the electronic device is connected, to perform an operation of the electronic device on behalf of the electronic device. The operation of the electronic device corresponds to periodically waking up from a sleep mode according to a system timer cycle (for example, a Discontinuous Reception (DRX) cycle) to identify paging and monitoring a channel (for example, a paging channel).

In the following description, the communication relay device may be used as a term including, for example, a device for relaying a communication connection according to a corresponding communication scheme in which the electronic device can use various networks. According to various example embodiments of the disclosure, the network may include a mobile communication network for a mobile communication service of the electronic device, a local area network for a short-range communication service of the electronic device, a personal area network for a short-range communication service of the electronic device, and the like.

According to various example embodiments of the disclosure, the mobile communication network may include, for example, networks supporting a communication scheme such as a Global System for Mobile telecommunication (GSM), a Universal Mobile Telecommunication System (UMTS), International Mobile Telecommunications-2000 (IMT-2000), Code Division Multiple access (CDMA), Wideband CDMA (WCDMA), and the like. According to various example embodiments of the disclosure, the local area network may include, for example, networks supporting a communication scheme such as Wi-Fi, Worldwide interoperability for Microwave Access (WiMAX), and the like as a Wireless Local Area Network (WLAN) technology. According to various example embodiments of the disclosure, the personal area network may include, for example, networks supporting a communication scheme such as Ultra WideB and (UWB), Bluetooth, Zigbee, and the like as a Wireless Personal Area Network (WPAN) technology. In the following description, both the local area network and the personal area network may, for example, be used as the wireless network. According to various example embodiments of the disclosure, the communication relay device may include a plurality of communication modules (for example, a mobile communication module and at least one wireless communication module including, for example, communication circuitry (for example, a short-range communication module and a WLAN module)) which can communicate with the mobile communication network and wireless network (for example, the local area network and the personal area network).

According to various example embodiments of the disclosure, the communication relay device may refer, for example, to an Access Point (AP) that communicates with the local area network to provide a wireless communication service to the electronic device, and a host device that forms the personal area network to provide a wireless communication service to the electronic device. According to various example embodiments of the disclosure, the access point and the host device may be included in the range of the electronic device, and may be implemented by various devices that simultaneously support at least one of the wireless networks (for example, at least some of the local area network and the personal area network) and the mobile communication network.

According to various example embodiments of the disclosure, various electronic devices may form a network (for example, a WLAN or a WPAN) through the communication relay device. According to various example embodiments of the disclosure, the communication relay device may support at least some functions of the electronic device related to communication with the mobile communication network while supporting communication of the electronic device with the wireless network.

According to various example embodiments of the disclosure, the communication relay device (for example, the access point or the host device) to which the electronic device is connected for communication with a second network (for example, a wireless network) may perform at least a part, of an operation corresponding to an operation of the electronic device in which the electronic device periodically wakes up from the sleep mode according to a given system timer cycle (for example, a DRX cycle) in a first network (for example, a mobile communication network), which the electronic device accesses, and processes a reception (Rx) operation with the first network, on behalf of the electronic device. For example, the electronic device may periodically wake up according to a system timer (for example, a DRX cycle) to allow the communication relay device to perform an operation of receiving periodic information (for example, frame information) from the first network on behalf of the electronic device. Accordingly, since the electronic device connected to the communication relay device, the electronic device may continuously maintain the sleep mode without waking-up, the electronic device may thus reduce power consumption generated according to the waking-up by the system timer (for example, the DRX cycle). According to an example embodiment, the electronic device does not need to wake up from the sleep mode in places (for example, places such as an office, home, public place, and the like where wireless communication through a connection with the communication relay device is possible) where the electronic device can be connected to the communication relay device, and may reduce and/or minimize current consumption of a battery without a communication disconnection as the communication relay device continuously performs the corresponding operation on behalf of the electronic device.

According to various example embodiments of the disclosure described below, for convenience of the description, the electronic device and the communication relay device (for example, an access point and a host device) are distinguished, which is described as an operation for reducing power consumption of the electronic device through an interworking between the electronic device and the communication relay device. However, according to various example embodiments of the disclosure, the communication relay device may be included in the range of the electronic device, and an operation of relaying communication with the network (for example, the mobile communication network) may be performed in various electronic devices as well as the communication relay device. For example, according to various example embodiments of the disclosure, the electronic device may include all devices using one or more of various processors (for example, the processors 120 and 210) such as an Application Processor (AP), a Communication Processor (CP), a Graphic Processing Unit (GPU), and a Central Processing Unit (CPU) including all information and communication devices, multimedia devices, wearable devices, and application devices thereof that support functions according to various example embodiments of the disclosure.

According to various example embodiments of the disclosure, the electronic device and the communication relay device may be connected to each other through a configured communication interface, and the electronic device may be configured to control the communication relay device connected through the configured communication interface or may be controlled by the communication relay device. According to various example embodiments of the disclosure, the connection between the electronic device and the communication relay device may be representatively a wireless connection through a wireless communication interface using a wireless network technology such as a personal communication network (for example, a Local Area Network (LAN) or a Personal Area Network (PAN)) but may be a wired connection through a wired communication interface using a Universal Serial Bus (USB), a data connector, a FireWire, an i.Link, and the like. According to various example embodiments of the disclosure, the personal communication network may refer to a network for communication between various electronic devices (for example, a communication relay device and another electronic device) within a communication range of the electronic devices based on a short-range communication technology. The short-range communication technology may use at least one of Wi-Fi, Bluetooth, Near Field Communication (NFC), Infrared Data Association (IrDA), Ultra WideBand (UWB), Zigbee, Radio Frequency Identification (RFID), and the like.

Hereinafter, an electronic device according to various example embodiments of the disclosure, a method of reducing and/or minimizing power consumption of the electronic device by using the communication relay device connected to the electronic device, and a system thereof will be described. However, various example embodiments of the disclosure may not be limited to the descriptions provided below and thus, it should be construed that the disclosure may be applied to various embodiments based on the following example embodiments.

Hereinafter, various example embodiments of the disclosure will be described based on an approach of hardware. However, various example embodiments of the disclosure include a technology that uses both hardware and software and thus, the various example embodiments of the disclosure may not exclude the software-based approach.

Figure 4:
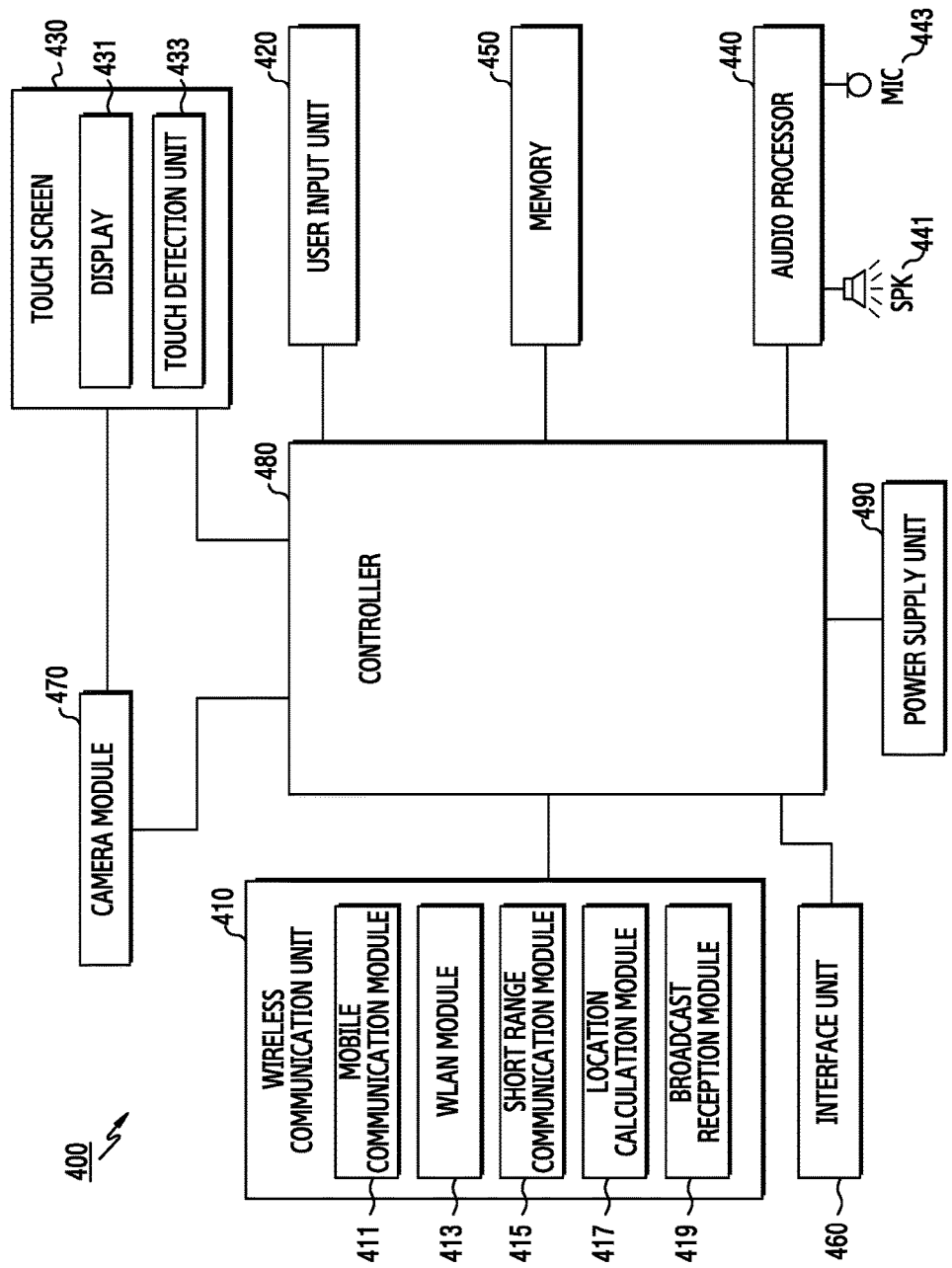
FIG. 4 is a block diagram illustrating an example configuration of an electronic device.

FIG. 4 is a block diagram illustrating an example configuration of an electronic device.

Referring to FIG. 4, an electronic device 400 according to various example embodiments of the disclosure may include, for example, a wireless communication unit (e.g., including communication circuitry) 410, a user input unit (e.g., including input circuitry) 420, a touch screen 430, an audio processor (e.g., including processing circuitry) 440, a memory 450, an interface unit (e.g., including interface circuitry) 460, a camera module 470, a controller (e.g., including processing circuitry) 480, and a power supply unit 490. According to various example embodiments of the disclosure, the electronic device 400 may include fewer or more elements when compared to the elements of FIG. 4, since all elements of FIG. 4 are not necessarily essential.

The wireless communication unit 410 may include a configuration identical or similar to the communication module 220 of FIG. 2. The wireless communication unit 410 may include, for example, one or more modules which enable wireless communication between the electronic device 400 and a wireless communication system or between the electronic device 400 and another electronic device (for example, an electronic device 102 or 104, or a server 106). For example, the wireless communication unit 410 may include a mobile communication module 411, a Wireless Local Area Network (WLAN) module 413, a short range communication module 415, a location calculation module 417, and a broadcast reception module 419. According to various example embodiments of the disclosure, the wireless communication unit 410 may perform wireless communication with a communication relay device (for example, an access point or a host device) based on a configured communication scheme.

The mobile communication module 411 may transmit/receive a wireless signal to/from at least one of a base station, an external electronic device (for example, the electronic device 104), and various servers (for example, an integration server, a provider server, a content server, an Internet server, a cloud server, and the like) over a mobile communication network. The wireless signal may include, for example, a voice call signal, a video call signal, or data in various forms according to the transmission and reception of text/multimedia messages.

The mobile communication module 411 may receive one or more pieces of data (for example, contents, a message, a mail, an image, a video, weather information, location information, time information, frame information, and the like). According to an example embodiment, the mobile communication module 411 may be connected to at least one other electronic device (for example, the electronic device 104 or the server 106) connected to the electronic device 400 through a network (for example, a mobile communication network) and acquire (receive) various pieces of data. The mobile communication module 411 may transmit various pieces of data required for the operations of the electronic device 400 to the outside (for example, the server 106, another electronic device 104, or the like) in response to a user's request.

The mobile communication module 411 may perform a communication function. For example, the mobile communication module 411 may convert a Radio Frequency (RF) signal into a baseband signal and provide the baseband signal to the controller 480, or convert the baseband signal from the controller 480 into the RF signal and transmit the RF signal under a control of the controller 480. The controller 480 may process the baseband signal based on various communication schemes. For example, the communication schemes may include a Global system for Mobile communication (GSM) scheme, an Enhanced Data GSM Environment (EDGE) communication scheme, a Code Division Multiple Access (CDMA) communication scheme, a W-CDMA communication scheme, a Long Term Evolution (LTE) communication scheme, or an Orthogonal Frequency Division Multiple Access (OFDMA) communication scheme, but are not limited thereto.

The WLAN module 413 may indicate a module for establishing a wireless Internet access and a wireless LAN link with another electronic device (for example, the electronic device 102 or the server 106). The WLAN module 413 may be mounted inside or outside the electronic device 400. Wireless Internet technologies may include Wi-Fi, wireless broadband (Wibro), world interoperability for microwave access (WiMax), high speed downlink packet access (HSDPA), millimeter wave (mmWave), and the like.

The WLAN module 413 may transmit or receive one or more pieces of data selected by a user to/from the outside. According to an example embodiment, the WLAN module 413 may interwork with at least one of another electronic device (for example, the communication relay device) and the server, connected to the electronic device 400 through a network (for example, a local area network or a wireless Internet network) and transmit or receive various pieces of data to or from the outside (for example, the communication relay device or the server). The WLAN module 413 may always maintain an on-state, or may be turned on based on settings of the electronic device 400 or a user input. In the following description, the WLAN module 413 and the short-range communication module 415 may be referred to as one term for a wireless communication module for convenience of the description.

The short-range communication module 415 may, for example, be a module for performing short-range communication. Short-range communication technologies may include Bluetooth, Bluetooth low energy (BLE), a radio frequency identification (RFID), infrared data association (IrDA), Ultra WideBand (UWB), Zigbee, Near Field Communication (NFC), and the like.

The short-range communication module 415 may receive one or more pieces of data. According to an example embodiment, the WLAN module 415 may interwork with another electronic device (for example, the communication relay device) connected to the electronic device 400 through a network (for example, a personal area network or a short-range communication network) and transmit or receive various pieces of data of the electronic device 400 to or from the other electronic device (for example, the communication relay device). The short-range communication module 415 may always maintain an on-state, or may be turned on based on settings of the electronic device 400 or a user input. In the following description, the short-range communication module 413 and the WLAN module 413 may be referred to as one term for a wireless communication module for convenience of the description.

The location calculation module 417 may, for example, be a module for obtaining the location of the electronic device 400, and may include a Global Position System (GPS) module as a representative example. The location calculation module 415 may measure the location of the electronic device 400 through a triangulation principle. For example, the location calculation module 417 may calculate three dimensional current location information according to a latitude, a longitude, and an altitude, by calculating distance information and time information on the location away from three or more base stations and then applying trigonometry to the calculated information. Alternatively, the location calculation module 417 may calculate location information by continuously receiving location information of the electronic device 400 from three or more satellites in real time. The location information of the electronic device 400 may be obtained by various methods.

The broadcast reception module 419 may receive a broadcast signal (for example, a TV broadcast signal, a radio broadcast signal, a data broadcast signal, and the like) and/or broadcast related information (for example, information associated with a broadcast channel, a broadcast program, or a broadcast service provider) from an external broadcast management server through a broadcast channel (for example, a satellite broadcast channel, a terrestrial broadcast channel, or the like).

The user input unit 420 may generate input data for controlling the operations of the electronic device 400 in response to an input, such as, for example, a user input. The user input unit 420 may include at least one input means for detecting various user inputs. For example, the user input unit 420 may include a keypad, a dome switch, a physical button, a touch pad (resistive type/capacitive type), a jog & shuttle, and a sensor (for example, the sensor module 240).

A part of the user input unit 420 may be implemented outside the electronic device 400 in a button form, or a part or all of the user input unit 420 may be implemented as a touch panel. The user input unit 420 may receive a user input for initiating the operation of the electronic device 400 according to various example embodiments of the disclosure, or may generate an input signal based on a user input. For example, the user input unit 420 may receive various user inputs for connecting the communication relay device, photographing an image, executing an application, inputting (making or inserting) data, changing a position of the electronic device 400, displaying contents, and transmitting or receiving data, and may generate input signals according to the user inputs.

The touch screen 430 may refer, for example, to an input/output interface that may simultaneously perform an input function and a display function, and may include a display 431 (for example, the display 160 or 260) and a touch detection unit 433. The touch screen 430 may provide an input/output interface between the electronic device 400 and the user, may transfer a touch input of the user to the electronic device 400, and may serve as a medium that shows an output from the electronic device 400 to the user. The touch screen 430 may show a visual output to the user. The visual output may be shown in a form of text, graphics, video, and a combination thereof. For example, according to various example embodiments of the disclosure, the touch screen 430 may display various screens according to the operation of the electronic device 400 through the display 431. For example, the various screens may include a messenger screen, a phone call screen, a game screen, a video reproduction screen, a gallery screen, a web page screen, a home screen, a network connection screen, or the like.

The touch screen 430 may detect an event (for example, a touch event, a hovering event, or an air gesture event) based on at least one of a touch, hovering, and air gesture from the user through the touch detection unit 433 while a particular screen is displayed through the display 431, and transmit an input signal according to the event to the controller 480. The controller 480 may distinguish the transferred event and control the performance of an operation according to the distinguished event.

According to various example embodiments of the disclosure, the display 431 may display (output) various pieces of information processed in the electronic device 400. For example, when the electronic device 400 is in a call mode, the display 431 may display a User Interface (UI) or Graphical User Interface (GUI) related to a call. Further, when the electronic device 400 is in a video call mode or a photography mode, the display 431 may display a photographed or/and received image and a UI or a GUI, related to the operation of the corresponding mode. The display 431 may display data or contents related to the use of the electronic device 400 or information on other electronic devices (for example, the communication relay device) connected to the network. The display 431 may display various application execution screens corresponding to an executed application.

The display 431 may support screen displaying based on a landscape mode, screen displaying based on a portrait mode, or screen displaying based on a change between the landscape mode and the portrait mode, according to a rotation direction (or an orientation) of the electronic device 400. The display 431 may use various displays (for example, the display 160). Some displays may be implemented as a transparent display in a transparent or photo-transparent type.

The touch detection unit 433 may be mounted on the display 431 or be part of the display 431, and may detect a user input that is in contact with or in proximity to the surface of the touch screen 430. The user input may include a touch event or a proximity event that is input based on at least one of a single-touch, a multi-touch, hovering, and an air gesture. For example, the user input may be made in the type of a tap, drag, sweep, flick, drag&drop, drawing gesture (for example, writing), and the like. The touch detection unit 433 may detect a user input (for example, a touch event or a proximity event) on the surface of the touch screen 430, generate a signal corresponding to the detected user input, and transfer the generated signal to the controller 480. The controller 480 may control execution of a function corresponding to an area where the user input (for example, the touch event or the proximity event) is generated by the signal transferred from the touch detection unit 433.

The touch detection unit 433 may receive a user input for initiating the operation related to the use of the electronic device 400 according to various example embodiments of the disclosure, or may generate an input signal based on the user input. The touch detection unit 433 may be configured to convert a change in pressure applied to a specific portion of the display 431 or a change in electrostatic capacitance generated at a specific portion of the display 431 into an electric input signal. The touch detection unit 433 may detect a location and an area of the surface of the display 431 which an input means (for example, a user's finger, an electronic pen, or the like) contacts or approaches. Further, the touch detection unit 433 may be implemented to detect pressure when the touch is made according to the applied touch type. When there is a touch or proximity input on the touch detection unit 433, a signal(s) corresponding to the touch or proximity input may be transferred to a touch screen controller (not illustrated). The touch screen controller (not illustrated) may process the signal(s), and then transmit corresponding data to the controller 480. Accordingly, the controller 480 may identify which area of the touch screen 430 is touched or approached, and process execution of a function corresponding to the touch or proximity.

The audio processor 440 may include a configuration identical or similar to the audio module 280 of FIG. 2. The audio processor 440 may perform a function of transmitting an audio signal received from the controller 480 to a speaker (SPK) 441, and transferring, to the controller 480, an audio signal such as a voice or the like, which is received by a microphone 443. The audio processor 440 may convert voice/sound data into an audible sound through the speaker 441 based on the control of the controller 480 and may output the audible sound, and may convert an audio signal such as a voice or the like which is received from the microphone 443 into a digital signal and may transfer the digital signal to the controller 480. The audio processor 440 may output an audio signal corresponding to a user input according to audio processing information (for example, an effect sound, a music file or the like) inserted into data.

The speaker 441 may output audio data that is received from the wireless communication unit 410 or stored in the memory 450. The speaker 441 may output a sound signal associated with various operations (functions) executed by the electronic device 400. The speaker 441 may be in charge of outputting an audio stream such as a voice recognition function, a voice copying function, a digital recording function, and a phone call function. Although not illustrated in various example embodiments of the disclosure, the speaker 441 may include attachable and detachable earphones, headphones, or a headset, which may be connected to the electronic device 400 through an external port.

The microphone 443 may receive an external sound signal and process the same to be electrical voice data. The voice data processed through the microphone 443 may be output after being converted into a form that is transmittable to the outside through the mobile communication module 411 when the electronic device 400 is in the call mode. Various noise reduction algorithms may be implemented in the microphone 443 to remove noise generated in the process of receiving an external sound signal. The microphone 443 may serve to input an audio stream such as a voice command (for example, a voice command for initiating a connection operation between the electronic device 400 and the communication relay device), voice recognition, digital recording, and a call function. For example, the microphone 443 may convert a voice signal into an electric signal. According to various example embodiments of the disclosure, the microphone 443 may include an internal microphone installed in the electronic device 400 and an external microphone connected to the electronic device 400.

The memory 450 (for example, the memory 130 or 230) may store one or more programs that are executed by the controller 480, and may execute a function for temporarily storing input/output data. The input/output data may include, for example, various pieces of identification information (for example, Temporary Mobile Subscriber Identity (TMSI), Packet-TMSI (P-TMSI), International Mobile Subscriber Identity (IMSI) (for example, information no a Mobile Country Code (MCC) and a Mobile Network Code (MNC)), International Mobile Station Equipment Identity (IMEI)), channel information (for example, paging channel information), contents, messenger data (for example, conversation data), contact information (for example, wired or wireless phone number, and the like), messages, media files (for example, audio files, video files, and image files), and the like.

The memory 450 may store one or more programs and data related to a control function for reducing power consumption of the electronic device 400. For example, according to various example embodiments of the disclosure, the memory 450 may store one or more programs for processing operations of connecting the electronic device 400 to the communication relay device, transmitting forwarding information (for example, identification information and channel information) to the connected communication relay device, determining whether the electronic device 400 enters a sleep mode, and, when it is determined that the electronic device 400 enters the sleep mode, informing the communication relay device that the electronic device 400 enters the sleep mode, and data processed according to the operations.

The memory 450 may also store a use frequency (for example, a connection frequency of the communication relay device, a use frequency of an application, a use frequency of contents, and the like) according to the operation of the electronic device 400, importance, and priorities. The memory 450 may store data related to various patterns of vibration and sound output in response to a touch input or a proximity input on the touch screen 430. The memory 450 may permanently or temporarily store an Operating System (OS) of the electronic device 400, a program related to an input and a display control using the touch screen 430, a program related to a control of various operations (functions) of the electronic device 400, and various pieces of data generated by the operations of the programs.

The memory 450 (for example, the memory 130 or 230) may include an expanded memory (for example, the external memory 234) or an internal memory (for example, the internal memory 232). The electronic device 400 may also operate in relation to a web storage performing a storage function of the memory 450 on the Internet.

The memory 450 may store various software. For example, software components may include an operating system software module, a communication software module, a graphic software module, a user interface software module, a Moving Picture Experts Group (MPEG) module, a camera software module, and one or more application software modules. Further, since the module, which is the component of software, may be expressed as a set of instructions, the module may be also expressed as an instruction set. The module may be also expressed as a program. According to various example embodiments of the disclosure, the memory 450 may include an additional module (instructions) as well as the above listed modules. Otherwise, the memory 450 may not use some modules (instructions) when necessary.

The operating system software module may include various software components for controlling a general system operation. Controlling the general system operation may, for example refer to managing and controlling the memory, controlling and managing storage hardware (device), and controlling and managing power. Further, the operating system software module may perform a function of smoothly executing communication between various hardware (devices) and software components (modules).

The communication software module may allow the electronic device to communicate with another electronic device such as a wearable device, a communication relay device, a computer, a server, or a portable terminal through the wireless communication unit 410. Further, the communication software module may be formed in a protocol structure corresponding to a corresponding communication scheme.

The graphic software module may include various software components for providing and displaying graphics on the touch screen 430. The term "graphics" is used to have a meaning including text, web page, icon, digital image, video, and animation.

The user interface software module may include various software components related to a User Interface (UI). For example, the user interface software module may include the content indicating how a state of the user interface is changed or indicating a condition under which the change in the state of the user interface is made.

The MPEG module may include a software component which enables digital contents (for example, video and audio data)-related processes and functions (for example, generation, reproduction, distribution, and transmission of contents).

The camera software module may include a camera-related software component which enables camera-related processes and functions.

The application module may include a web browser including a rendering engine, email, instant message, word processing, keyboard emulation, address book, touch list, widget, Digital Right Management (DRM), voice recognition, position determining function, location based service, and the like. According to various example embodiments of the disclosure, the application module may include instructions for establishing a connection with the communication relay device. For example, the application module may notify the communication relay device of information on switching to the sleep state in a sleep mode entering process of the electronic device 400, and continuously maintain the sleep mode of the electronic device 400 before a paging is received through the communication relay device in the sleep mode of the electronic device 400.

The interface unit 460 may have a configuration identical or similar to the interface 270 of FIG. 2. The interface unit 460 may serve as an interface between the electronic device 400 and all external devices connected to the electronic device 400. The interface unit 460 may receive data from an external device, receive power and transfer the power to respective elements within the electronic device 400, or transmit data within the electronic device 400 to the external device. For example, the interface unit 460 may include a wired/wireless headset port, an external charger port, a wired/wireless data port, a memory card port, a port for connecting a device provided with an identification module, an audio input/output port, a video input/output port, an earphone port, and the like.

The camera module 470 (for example, the camera module 291) may indicate a configuration that supports a photographing function of the electronic device 400. The camera module 470 may support photographing of an image (a still image or a dynamic image) of a subject. The camera module 470 may photograph a predetermined subject based on the control of the controller 480, and may transfer the photographed data to the display 431 and the controller 480. The camera module 470 may include an image sensor (or a camera sensor) (not illustrated) for converting an input optical signal into an electric signal and an image signal processor (not illustrated) for converting the electric signal input from the image sensor into digital image data. The image sensor may include a sensor using a Charge-Coupled Device (CCD) or a Complementary Metal-Oxide-Semiconductor (CMOS), or the like. Additionally or alternatively, the camera module 470 may include, for example, a color sensor for sensing a wavelength of light radiated or reflected by an object and determining a color. The camera module 470 may support an image processing function for supporting photographing according to various photographing options (for example, zooming, a screen ratio, an effect (for example, sketch, mono, sepia, vintage, mosaic, and a picture frame)) in accordance with user's settings.

The controller 480 may be configured to control a general operation of the electronic device 400. For example, the controller 480 may perform a control related to voice communication, data communication, video communication, and the like. The controller 480 may include one or more processors (for example, the processor 210) or may be called a processor. For example, the controller 480 may include a Communication Processor (CP), an Application Processor (AP), an interface (for example, General Purpose Input/Output: GPIO), or an internal memory, as a separate component, or integrate them into one or more integrated circuits. The application processor may execute various software programs to perform various functions for the electronic device 400, and the communication processor may process and control voice communication and data communication. Further, the controller 480 may serve to execute a particular software module (instruction set) stored in the memory 450 and perform various particular functions corresponding to the module.

According to various example embodiments of the disclosure, the controller 480 may be configured to control an operation related to the performance of a function of controlling to reduce power consumption of the electronic device 400. For example, the controller 480 may control the connection with the communication relay device through the wireless communication module (for example, the WLAN module 413 or the short range communication module 415) of the electronic device 400 and transmission of forwarding information (for example, identification information, channel information, or the like) of the electronic device 400 to the connected communication relay device (for example, the access point or the host device). The controller 480 may determine whether the electronic device 400 enters the sleep mode in which the electronic device 400 switches to the sleep state by checking a state of the electronic device 400 and control the sleep mode entering of the electronic device 400. When it is determined that the electronic device 480 enters the sleep mode, the controller 480 may notify the communication relay device of the entering of the sleep mode and then control the entering of the sleep mode. The controller 480 may wake up according to a wake-up signal by the WLAN module 413 in the sleep mode and process an operation (for example, connection or rejection of an incoming call) related to the paging received from the communication relay device through the wireless communication module (for example, the WLAN module 413 or the short range communication module 415).

According to various example embodiments of the disclosure, the controller 480 may connect the communication relay device based on wired or wireless communication.

According to various example embodiments of the disclosure, the controller 480 may interwork with the software modules stored in the memory 450 to perform an operation of reducing power consumption of the electronic device 400 according to various example embodiments. Further, according to various example embodiments of the disclosure, the controller 480 may be implemented by one or more modules which may process the various functions. In addition, according to various example embodiments of the disclosure, the controller 480 may be implemented by one or more processors that control the operation for example, the operation of reducing power consumption) of the electronic device 400 (according to various embodiments of the present disclosure by executing one or more programs stored in the memory 450.

The controller 480 according to various example embodiments of the disclosure may control various operations related to a general function of the electronic device 400 in addition to the aforementioned functions. For example, when a specific application is executed, the controller 480 may control an operation and a screen display of the specific application. Further, the controller 480 may receive input signals corresponding to various touch event inputs or proximity event inputs supported by a touch-based or proximity-based input interface (for example, the touch screen 430) and may control execution of functions according to the received input signals. Moreover, the controller 480 may also control transmission/reception of various types of data based on wired communication or wireless communication.

The power supply unit 490 may receive external power or internal power based on the control of the controller 480, and may supply power required for the operation of each element. According to various example embodiments of the disclosure, the power supply unit 490 may supply or block (on/off) the power to one or more processors of the controller 480, the display 431, and the wireless communication unit 410 under a control of the controller 480.

Various example embodiments described in the disclosure may be implemented in a computer or a similar device-readable recording medium through software, hardware or a combination thereof. According to the hardware implementation, various example embodiments of the disclosure may be implemented using at least one of hardware circuitry, firmware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and electrical units for performing other functions.

According to various example embodiments of the disclosure, the recording medium may include a computer-readable recording medium having a program recorded therein to execute an operation of connecting the electronic device 400 to the communication relay device (for example, the access point or the host device) and an operation of performing channel monitoring according to a system timer cycle of the electronic device by the communication relay device on behalf of the electronic device.

In some cases, the example embodiments described in the disclosure may be implemented by the controller 480 itself. Furthermore, according to the software implementation, the example embodiments such as processes and functions described in the present specification may also be implemented as separate software modules. The software modules may perform one or more functions and operations described in the disclosure.

According to various example embodiments of the disclosure, at least some functions performed by the electronic device 400 may be performed by an external device (for example, the server 106 or the communication relay device). For example, the server 106 (or the communication relay device) may include a processing module corresponding to the controller 480, process at least some functions related to the reduction in power consumption of the electronic device 400 at least partially based on information transmitted from the electronic device 400 through the processing module, and transmit a result of the processing to the electronic device 400.

As described above, the electronic device 400 according to various example embodiments of the disclosure may include the wireless communication module (for example, the WLAN module 413 and the short range communication module 415) for communicating with the communication relay device (for example, the access point or the host device), the mobile communication module 411 for communicating with a service provider network, and the processor (for example, the controller 480) functionally connected to the mobile communication module. When the electronic device 400 is in the sleep mode when the electronic device 400 is connected to the communication relay device, the processor may maintain the sleep mode in the system timer cycle and, when data of the service provider network is forwarded from the communication relay device, wake up from the sleep mode and process an operation related to the data together with the service provider network.

According to various example embodiments of the disclosure, the processor of the electronic device 400 may include an Application Processor (AP) and a Communication Processor (CP).

According to various example embodiments of the disclosure, when the electronic device 400 is connected to the communication relay device, the processor may transmit the forwarding information of the electronic device 400 to the communication relay device through the wireless communication module (for example, the WLAN module 413 or the short range communication module 415) and, when it is determined to enter the sleep mode, notify the communication relay device of the entering to the sleep mode and disable a system timer operation when the electronic device 400 enters the sleep mode.

According to various example embodiments of the disclosure, the forwarding information may include identification information for identifying the electronic device 400 and channel information for monitoring a channel together with the service provider network.

Hereinafter, various network environments (for example, a local network environment (FIG. 5A), a personal area network environment (FIG. 5B), a complex network environment (FIG. 5C)), and an operation between the electronic device 400 and the communication relay device (for example, the access point or the host device) implemented in accordance with each network environment will be described with reference to FIGS. 5A, 5B, and 5C.

Figure 5A:
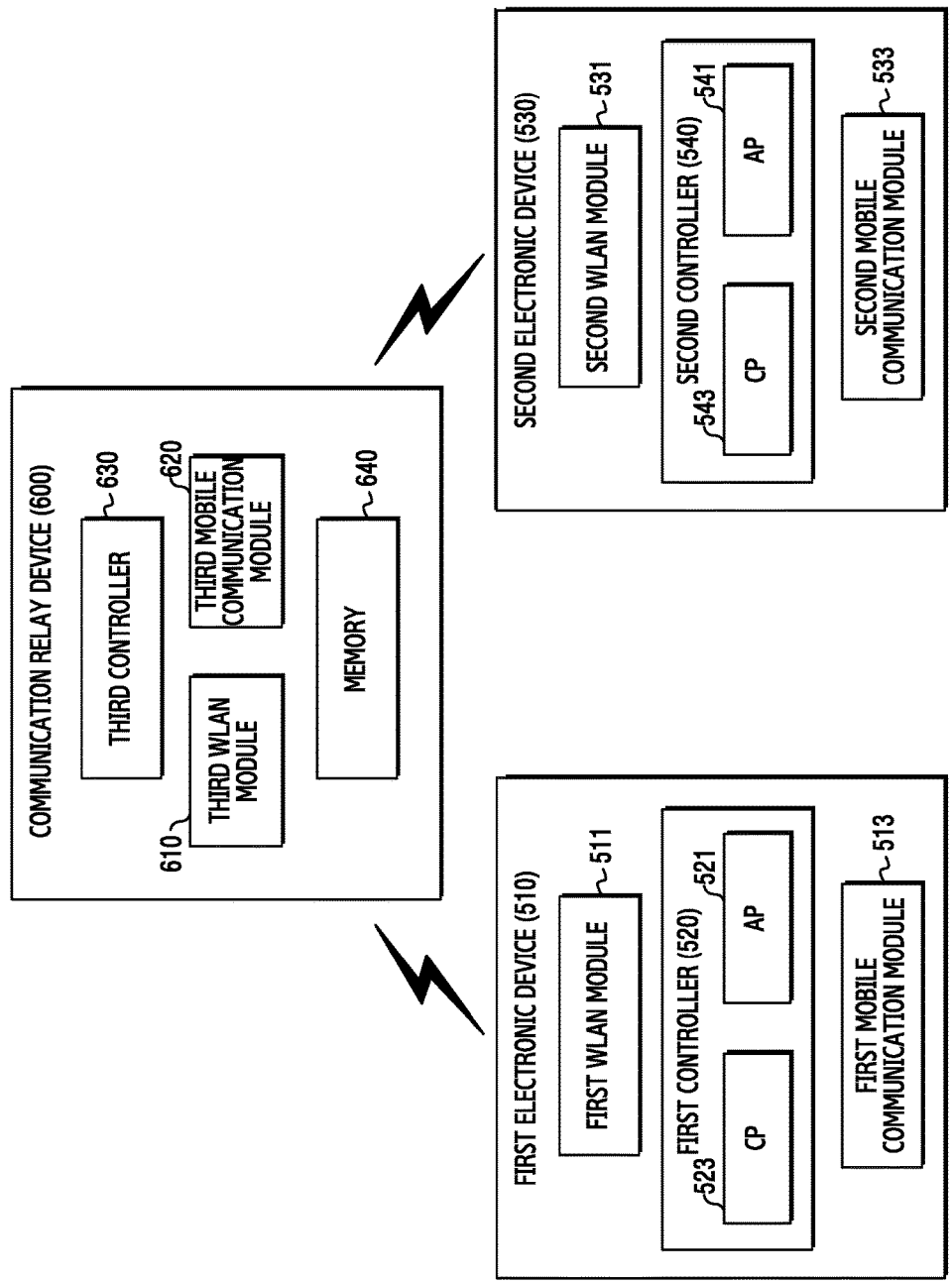
FIGS. 5A, 5B, and 5C are diagrams illustrating example operations between an electronic device and a communication relay device.
Figure 5B:
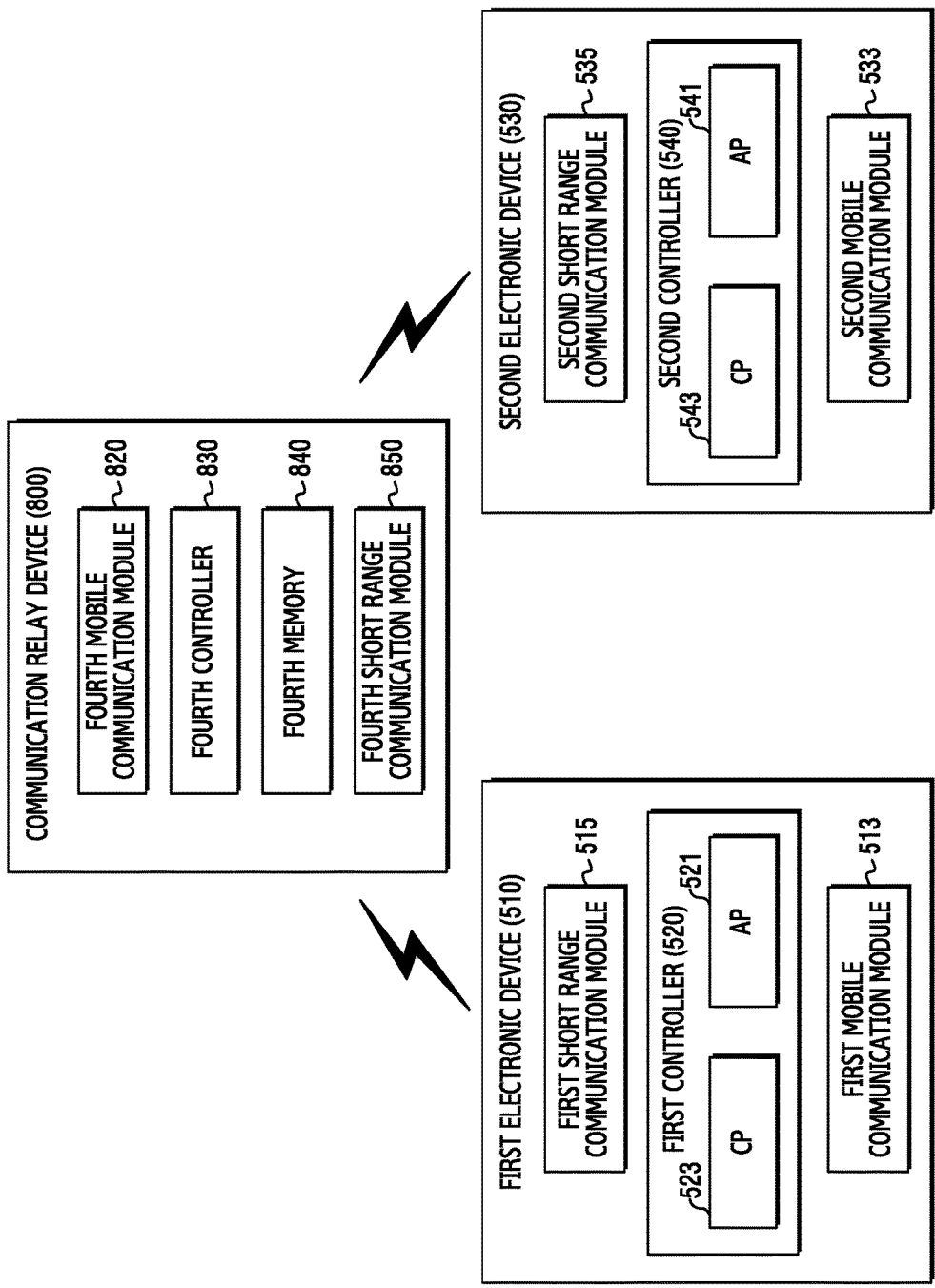
Figure 5C:
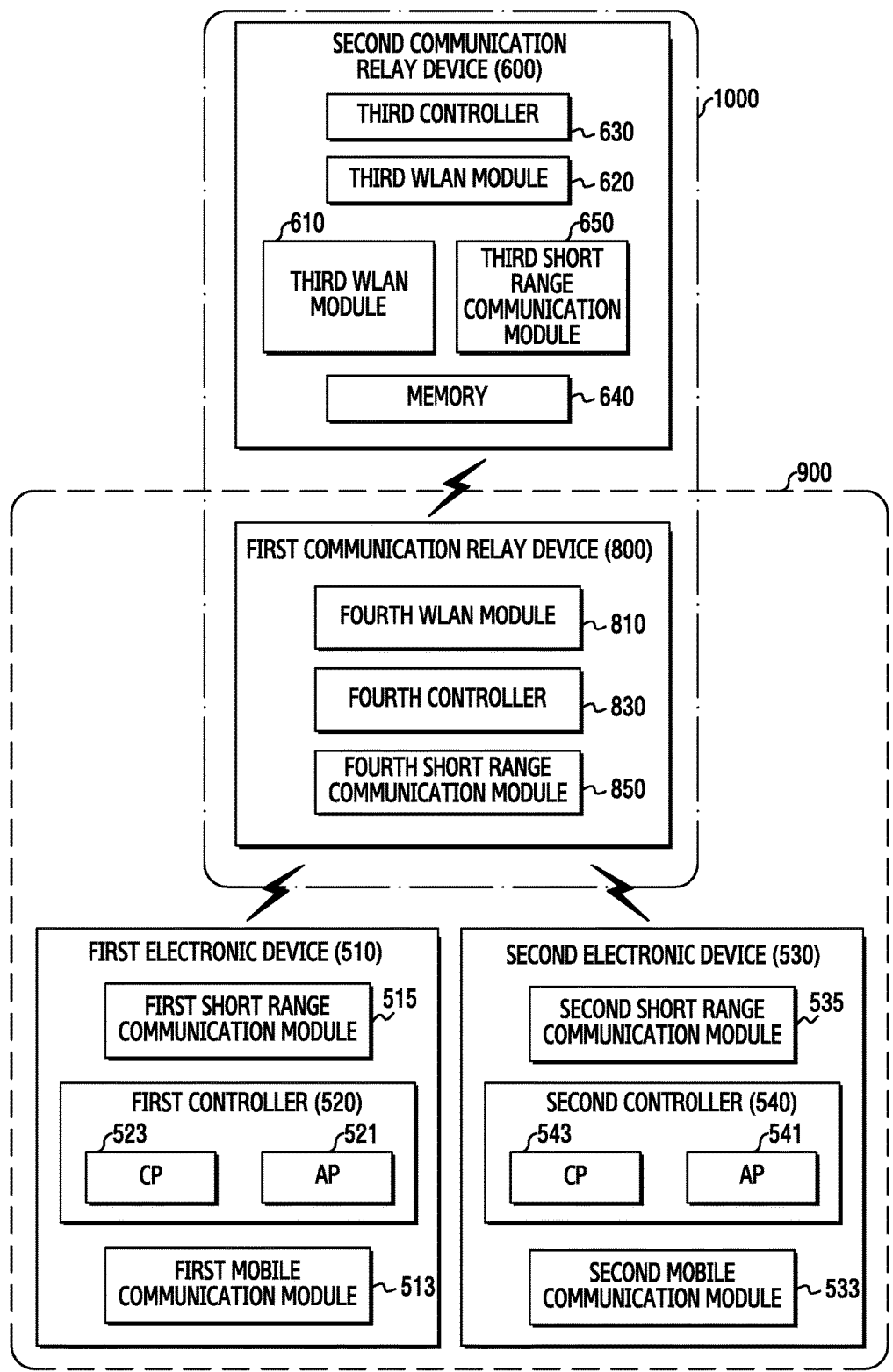

Prior to the description of example embodiments of the disclosure with reference to FIGS. 5A, 5B, and 5C, the electronic device (for example, a first electronic device 510 or a second electronic device 530) generally support a sleep mode (low power mode) to reduce power consumption. When the electronic device enters the sleep mode, the electronic device may periodically exchange information with the mobile communication network according to a system timer (for example, every DRX cycle) arranged between the electronic device and the mobile communication network. For example, the electronic device may wake up according to the system timer (for example, every 100 ms) in the sleep mode, and a polling operation may be performed by the mobile communication network. The electronic device may periodically wake up according to the system timer and inquire the mobile communication network about whether there is a reception request (for example, data or paging). The electronic device may start a related reception when there is the reception request, and receive an NACK and enter the sleep mode when there is no reception request.

As described above, although the electronic device enters the sleep mode for the low power mode, the electronic device may continuously generate power consumption due to the constraint condition such as the operation by the wake-up according to the system timer.

As described above, the electronic device may periodically wake up according to the system timer, so that the generated power consumption can be reduced. According to various example embodiments of the disclosure, a communication relay device (for example, the access point) to which the electronic device is connected performs the operation (function) (for example, channel monitoring), which is originally performed by the electronic device periodically according to the system timer, on behalf of the electronic device, thereby reducing power consumption due to the wake-up of the electronic device. Hereinafter, various example embodiments of the disclosure will be described in more detail with reference to the drawings.

FIG. 5A is a block diagram illustrating an example operation between the electronic device and the communication relay device.

As illustrated in FIG. 5A, the electronic device 400 (see FIG. 4) and a communication relay device 600 communicate based on a local area network (for example, WLAN) and the communication relay device 600 is implemented as the access point that forms the local area network.

Each of a first electronic device 510 and a second electronic device 530 may include, for example, all or some of the electronic device 400 illustrated in FIG. 4 and may be a device of the same type as or a different type from the electronic device 400. The first electronic device 510 and the second electronic device 530 may include controllers (for example, a first controller 520 and a second controller 540) including application processors (for example, an AP 521 and an AP 541), communication processors (for example, a CP 523 and a CP 543), WLAN modules (for example, a first WLAN module 511 and a second WLAN module 531), and mobile communication modules (for example, a first mobile communication module 513 and a second mobile communication module 533), respectively. The first electronic device 510 and the second electronic device 530 may communicate with the mobile communication network through the mobile communication modules (for example, the first mobile communication module 513 and the second mobile communication module 533), respectively, and may be connected to the communication relay device 600 (for example, the access point) through the WLAN modules (for example, the first WLAN module 511 and the second WLAN module 531), respectively, to communicate with the local area network (for example, a Wi-Fi network).

The communication relay device 600 may include a third WLAN module 610, a third mobile communication module 620, a third controller 630, and a memory 640. The memory 640 of the communication relay device 600 may be an internal memory of the communication relay device 600 or an external memory of the communication relay device 600. According to various example embodiments of the disclosure, the communication relay device 600 may include access points which can relay communication between various networks (for example, the mobile communication network and the local area network) and one or more electronic devices (for example, the first electronic device 510 and the second electronic device 530).

The communication relay device 600 may be connected to the first electronic device 510 and/or the second electronic device 530 through the third WLAN module 610, and may relay communication between the first electronic device 510 and/or the second electronic device 530 and the local network (for example, the Wi-Fi network) under a control of the third controller 630. Further, the communication relay device 600 may be connected to the mobile communication network through the third mobile communication module 620, and may intercept a signal (for example, information (for example, frame information) transmitted according to a system timer configured in the mobile communication network) transmitted to an address (receiving address) of the first electronic device 510 and/or the second electronic device 530 in the mobile communication network and relay the signal to the corresponding electronic device under a control of the third controller 630.

The first electronic device 510 and the second electronic device 530 (for example, the first controller 520 and the second controller 540) may transmit at least one piece of identification information (for example, information on TMSI, P-TMSI, IMSI, and the like) which can identify the first electronic device 510 and the second electronic device 530 to the communication relay device 600 and register the identification information. Further, the first electronic device 510 and the second electronic device 530 may transmit channel information (for example, paging channel information) related to a channel (for example, a paging channel), which the first electronic device 510 and the second electronic device 530 configure together with the mobile communication network, to the communication relay device 600 and register the channel information. For example, the first electronic device 510 and the second electronic device 530 may transmit identification information and channel information to the communication relay device 600 under a control of the controller (for example, the first controller 520 and the second controller 540) at every time point when the first electronic device 510 and the second electronic device 530 are connected to the communication relay device 600 or at a time point when the first electronic device 510 and the second electronic device 530 are initially connected to the communication relay device 600. The paging channel may refer to a channel used for transferring control information (for example, various pieces of information for forming a call channel in a service provider network) to an electronic device, to which the call channel is not allocated, and the mobile communication network may periodically transmit frequency channel configuration information to all electronic devices through the paging channel.

The communication relay device 600 may connect one or more electronic devices within a supportable range, and divide the identification information and the channel information transmitted from the connected electronic devices based on each electronic device and store (register) and manage the divided information in an internal memory or an external memory.

Referring to FIG. 5A, the electronic devices (for example, the first electronic device 510 and the second electronic device 530) may enter a communication coverage which can be supported by the communication relay device 600 and may be connected to the communication relay device 600 according to a general process of attempting a search and a connection of the communication relay device 600. Hereinafter, although an operation with the communication relay device 600 based on the first electronic device 510 will be described for convenience of the description, the corresponding operation may be performed in the second electronic device 530.

The first electronic device 510 may be connected to the communication relay device 600 through the first WLAN module 511. The first electronic device 510 may transmit forwarding information of the first electronic device 510 to the communication relay device 600 when the first electronic device 510 is connected to the communication relay device 600. According to various example embodiments of the disclosure, the forwarding information may be information for allowing the communication relay device 600 to intercept data (for example, frame information and paging), which the mobile communication network transmits to the first electronic device 510, to receive the data. For example, the forwarding information may include identification information of the first electronic device 510 and channel information (for example, paging channel information) which the first electronic device 510 uses with the mobile communication network.

The communication relay device 600 may be configured to control the wake-up of the first electronic device 510 as necessary. For example, when the communication relay device 600 receives the data which the mobile communication network transmits to the address (receiving address) of the first electronic device 510, the communication relay device 600 may be configured to perform a control to wake up the first electronic device 510 in response to an ACK (for example, paging) of the received data and forward the received data to the first electronic device 510. Further, the communication relay device 600 may wait for the next system timer without waking up the first electronic device 510 in response to an NACK of the received data.

The communication relay device 600 may receive the forwarding information (for example, identification information and channel information) transmitted from the first electronic device 510 through the third WLAN module 610, and register (store) the forwarding information in the memory 640 to manage the forwarding information. According to various example embodiments of the disclosure, the forwarding information may include the identification information and the channel information of the first electronic device 510. Accordingly, the communication relay device 600 may form a channel (for example, a paging channel) with the mobile communication network through the third mobile communication module 620 based on the channel information and intercept the data (for example, frame information), which the mobile communication network periodically transmits to the first electronic device 510 through the channel.

When the communication relay device 600 identifies the intercepted data and determines that the data (for example, ACK (paging)) requires a connection between the first electronic device 510 and the mobile communication network, the communication relay device 600 may forward the data to the first electronic device 510 through the third WLAN module 610. When forwarding the data, the communication relay device 600 may forward the data containing a control signal (or a control command) (for example, a wake-up signal) for controlling the wake-up of the first electronic device 510.

The first electronic device 510 may receive the control signal and the data from the communication relay device 600 connected through the first WLAN module 511. The first electronic device 510 may wake up the first controller 520 by the control signal. For example, the first electronic device 510 may wake up the AP 521 of the first controller 520 in response to the control signal and wake up the CP 523 of the first controller 520 by the woken up AP 521. The first electronic device 510 may perform a communication connection (for example, a call connection) process and a related operation with the mobile communication network corresponding to the data by the CP 523 of the first controller 520.

According to various example embodiments of the disclosure, the AP (for example, the AP 521 of the first controller 520) of the electronic device may refer to a processor that processes instructions to make the functions of the electronic device properly executed. The AP of the electronic device may include both a Central Processing Unit (CPU) function and a chipset (for example, a Graphic Processing Unit (GPU)) function for controlling another device. For example, the AP of the electronic device may refer to a System-on-Chip (SoC) that drives an OS and applications required by the electronic device and includes functions for controlling various system devices or interfaces in one chip. According to various embodiments, the AP 521 of the first controller 520 may be woken up in response to the control signal received and transferred through the first WLAN module 511 in the sleep state.

According to various example embodiments of the disclosure, the CP (for example, the CP 523 of the first controller 520) of the electronic device corresponds to a process that serves to perform communication between the electronic device and the mobile communication network and, when the electronic device desires to use a communication function through the connection with the mobile communication network, may perform a function of establishing the connection to make a communication connection and to enable data communication. According to various example embodiments, the CP 523 of the first controller 520 may be woken up by the AP 521 of the first controller 520 in the sleep state and process communication with the mobile communication network by controlling the first mobile communication module 513.

FIG. 5B is a block diagram illustrating an example operation between the electronic device and the communication relay device.

As illustrated in FIG. 5B, the electronic device 400 (see FIG. 4) and the communication relay device 600 communicate based on a personal area network (for example, WPAN) and the communication relay device 600 is implemented as a host device that forms the personal area network.

Referring to FIG. 5B, each of the first electronic device 510 and the second electronic device 530 illustrated in FIG. 5B may include, for example, a configuration corresponding to the configuration of the electronic device described with reference to FIG. 5A. However, in FIG. 5B, the component for supporting the connection with the communication relay device 600 may be a short range communication module (for example, the first short range communication module 515 and the second short range communication module 535) for the personal area network and the short range communication module may perform the function of the WLAN module (for example, a first WLAN module 511 and a second WLAN module 531) for the local area network of FIG. 5A on behalf of the WLAN module.

According to an example embodiment, in FIG. 5B, the electronic devices 510 and 530 may be connected to the communication relay device 600 (for example, a host device 800) to communicate with the personal area network (for example, WPAN) instead of being connected to the communication relay device 600 (for example, the access point) to communicate with the local area network (for example, WLAN). Accordingly, the difference between FIGS. 5A and 5B may be a communication scheme according to the WLAN module and the short range communication module, and the operation of the electronic devices 510 and 530, other elements (for example, the mobile communication module and the controller) of the electronic devices 510 and 530, and the operation of the other elements may correspond to the operations described with reference to FIG. 5A, and a description thereof will be omitted.

Further, FIG. 5B illustrates a case where various example embodiments of the disclosure are implemented by the personal area network (for example, WPAN) environment and, accordingly, the communication relay device 600 may be replaced with another electronic device (for example, the host device 800) corresponding to a subject that forms the personal area network. In FIG. 5B, the host device 800, which serves as the communication relay device 600, may include a fourth short range communication module 850, a fourth mobile communication module 820, a fourth controller 830, and a fourth memory 840.

The host device 800 of FIG. 5B may have a configuration corresponding to the communication relay device 600 (for example, the access point) as described with reference to FIG. 5A. However, for the personal area network, the host device 800 may include the short range communication module instead of the WLAN module and support an operation for reducing power consumption of the electronic device 400.

According to an example embodiment, the fourth mobile communication module 820, the fourth controller 830, and the fourth memory 840 of the host device 800 of FIG. 5B may correspond to the third mobile communication module 620, the third controller 630, and the memory 640 of the communication relay device 600 (for example, the access point) of FIG. 5A, respectively, and the fourth short range communication module 850 of the host device 800 may support communication with the electronic device 400 based on a short range communication technology instead of performing the function of the third WLAN module 610 of FIG. 5A. Accordingly, the difference between FIGS. 5A and 5B may be a communication scheme according to the WLAN module and the short range communication module, and the operation of the host device 800, other elements (for example, the mobile communication module, the memory, and the controller) of the host device 800, and the operation of the other elements may correspond to the operations described with reference to FIG. 5A, and a description thereof will be omitted.

FIG. 5C is a block diagram illustrating an example operation between the electronic device and the communication relay device.

As illustrated in FIG. 5C, a connection between the electronic device 400 and the a first communication relay device (for example, the host device 800) is made based on a personal area network 900 (for example, WPAN) and a connection between the first communication relay device (for example, the host device 800) and the second communication relay device (for example, the access point 600) is made based on a local area network 1000 (for example, WLNA).

For example, the first communication relay device (for example, the host device 800) and the electronic device 400 within the WPAN 900 may communicate based on the short range communication module. The communication between the first communication relay device (for example, the host device 800) and the electronic device 400 may correspond to the part described with reference to FIG. 5B.

The first communication relay device (for example, the host device 800) and the second communication relay device (for example, the access point 600) within the WLAN 1000 may communicate based on the WLAN module. The communication between the first communication relay device (for example, the host device 800) and the second communication relay device (for example, the access point 600) may correspond to the part described in connection with the communication between the communication relay device (for example, the access point 600) and the electronic device 400 with reference to FIG. 5A.

According to various example embodiments, the first communication relay device (for example, the host device 800) may form the personal area network (for example, the WPAN 900) with the electronic device 400 (for example, the first electronic device 510 and the second electronic device 530) based on the short range communication module (for example, the first short range communication module 515, the second short range communication module 535, and the fourth short range communication module 850) and perform operations related to acquiring the forwarding information of the electronic device 400 and waking up the electronic device 400, described in FIG. 5A. According to an example embodiment, the first communication relay device (for example, the host device 800) may collect, store, and manage the forwarding information of the electronic device (for example, the first electronic device 510 or the second electronic device 530), and forward the forwarding information to the second communication relay device (for example, the access point 600). Further, the first communication relay device (for example, the host device 800) may receive a paging notification corresponding to the electronic device (for example, the first electronic device 510 or the second electronic device 530) from the second communication relay device (for example, the access point 600), transfer the paging notification to the electronic device corresponding to the paging notification between the electronic devices (for example, the first electronic device 510 and the second electronic device 530) connected to the first communication relay device, and get involved in an operation related to the wake-up of the corresponding electronic device.

According to various example embodiments, the second communication relay device (for example, the access point 600) may form the local area network (for example, the WLAN 1000) with the first communication relay device (for example, the host device 800) based on the WLAN module (for example, the third WLAN module 610 and the fourth WLAN module 810), acquire the forwarding information of the electronic device 400 and perform the operation (function) (for example, channel monitoring), which is originally performed by the electronic device 400 periodically woken up according to the system timer described in FIG. 5A, based on the forwarding information on behalf of the electronic device 400. According to an example embodiment, the second communication relay device (for example, the access point 600) may receive the forwarding information of the electronic device (for example, the first electronic device 510 or the second electronic device 530) from the first communication relay device (for example, the host device 800), store and manage the received forwarding information, and communicate with the network (for example, the mobile communication network) through the mobile communication module (for example, the third mobile communication module 620) to monitor the channel for the electronic device (for example, the first electronic device 510 or the second electronic device 530). The second communication relay device (for example, the access point 600) may intercept data, which the network (for example, the mobile communication network) periodically transmits to the electronic device (for example, the first electronic device 510 or the second electronic device 530), based on the forwarding information (for example, channel information). When the intercepted data corresponds to the paging, the second communication relay device (for example, the access point 600) may transfer a paging notification to the first communication relay device (for example, the host device 800) connected to the electronic device.

Additionally or alternatively, according to various example embodiments, the first communication relay device (for example, the host device 800) and the second communication relay device (for example, the access point 600) may be implemented to form the WPAN based on the short range communication module and communicate with each other, and the first communication relay device (for example, the host device 800) and the electronic device (for example, the first electronic device 510 or the second electronic device 530) may be implemented to form the WLAN based on the WLAN module and communicate with each other. Further, according to various example embodiments, the first communication relay device (for example, the host device 800) and the second communication relay device (for example, the access point 600) may be implemented to form the WPAN based on the short range communication module and communicate with each other, and the first communication relay device (for example, the host device 800) and the electronic device (for example, the first electronic device 510 or the second electronic device 530) may be implemented to form the WPAN based on the short range communication module and communicate with each other.

Hereinafter, although the following description will be made based on an example embodiment in which the electronic device 400 and the communication relay device 600 (for example, the access point) operate in the local area network (WLAN) for convenience of the description, various example embodiments of the disclosure are not limited thereto and may be implemented in various network environments as well as the network environments of FIGS. 5A to 5C described above.

As described above, according to various example embodiments of the disclosure, the communication relay device (for example, the access point or the host device) connected to the electronic device may have information (for example, identification information) of the electronic device and information (for example, channel information and the like) required when the electronic device operates with the mobile communication network according to the system timer, configured therein. The communication relay device may process the corresponding function (operation) of the electronic device according to the system timer on behalf of the electronic device while the electronic device is in the sleep mode and, accordingly, the electronic device may omit periodic waking-up performed in the sleep mode according to the system timer and the channel monitoring operation according to the omission of the periodic waking-up.

According to various example embodiments of the disclosure, the communication relay device (for example, the access point or the host device) may be configured to perform the operation part of the system timer on behalf of the electronic device, e.g., in which the electronic device would normally periodically wake up from the sleep mode, and thus current consumption of the battery during the sleep mode of the electronic device can be reduced and/or minimized. For example, in the conventional art, the controller of the electronic device had to wake up and perform channel monitoring according to the system timer to periodically exchange data with the mobile communication network even when the electronic device enters the sleep mode. In contrast, according to various example embodiments of the disclosure, the operation part of the electronic device according to the system timer may be performed by the communication relay device on behalf of the electronic device and, accordingly, the controller of the electronic device may continuously remain in the sleep mode without periodic wake-up. Further, according to various example embodiments of the disclosure, when an event such as paging (for example, an incoming call) for the electronic device is generated, the communication relay device may transmit, through pre-registered identification information of the electronic device, a control signal to the wireless communication module (for example, the WLAN module or the short range communication module) of the corresponding electronic device and wake up the corresponding electronic device, thereby allowing the electronic device to normally process the incoming call.

As described above, the communication relay device (for example, the access point 600 or the host device 800) (hereinafter, referred to as the communication relay device 600) for supporting a reduction in power consumption of the electronic device 400 according to various example embodiments of the disclosure may include the wireless communication module (for example, the third WLAN module 610 or the fourth short range communication module 850), the mobile communication module (for example, the third mobile communication module 620 or the fourth mobile communication module 820) communicating with the service provider network 700, and the processor (for example, the third controller 630 or the fourth controller 830) functionally connected to the wireless communication module and the mobile communication module, and the processor may receive and register forwarding information of the electronic device 400 and be configured to perform channel monitoring corresponding to the electronic device 400 based on the forwarding information in response to a notification of entering the sleep mode of the electronic device 400.

As described above, the system that supports the reduction in power consumption of the electronic device 40 according to various embodiments of the present disclosure may include the service provider network (for example, a service provider network 700 described below with reference, for example, to FIGS. 6-8 and 12), the electronic device 400 (for example, the first electronic device 510 or the second electronic device 530), and the communication relay device 600.

In the system according to various example embodiments of the disclosure, the service provider network 700 may provide a mobile communication service to the electronic device 400 (for example, the first electronic device 510 or the second electronic device 530). Further, the service provider network 700 may poll the electronic device 400 according to the system timer cycle (for example, DRX cycle) and broadcast the paging to the electronic device 400 as a destination.

In the system according to various example embodiments of the disclosure, the electronic device 400 (for example, the first electronic device 510 or the second electronic device 530) may communicate the service provider network 700. Further, when entering the sleep mode in a state where the electronic device 400 is connected to the communication relay device 600, the electronic device 400 may provide the communication relay device 600 with forwarding information (for example, identification information and channel information) for channel monitoring of the communication relay device 600 corresponding to the polling of the service provider network 700. In addition, when the electronic device 400 is in the sleep mode, the electronic device 400 may maintain the sleep mode in the system timer cycle and, when the data of the service provider network 700 is forwarded by the communication relay device 600, wake up from the sleep mode and process an operation related to the data.

In the system according to various example embodiments of the disclosure, the communication relay device 600 may be connected to the electronic device 400 (for example, the first electronic device 510 or the second electronic device 530). Further, when the electronic device 400 is in the sleep mode, the communication relay device 600 may form a channel with the service provider network 700 based on the forwarding information of the electronic device 400 and perform channel monitoring corresponding to the electronic device 400. In addition, when detecting the data on the electronic device 400 according to the channel monitoring, the communication relay device 600 may forward the data to the electronic device 400 and control the electronic device 400 to wake up.

Hereinafter, various example embodiments for implementing the disclosure described above will be described.

Figure 6:
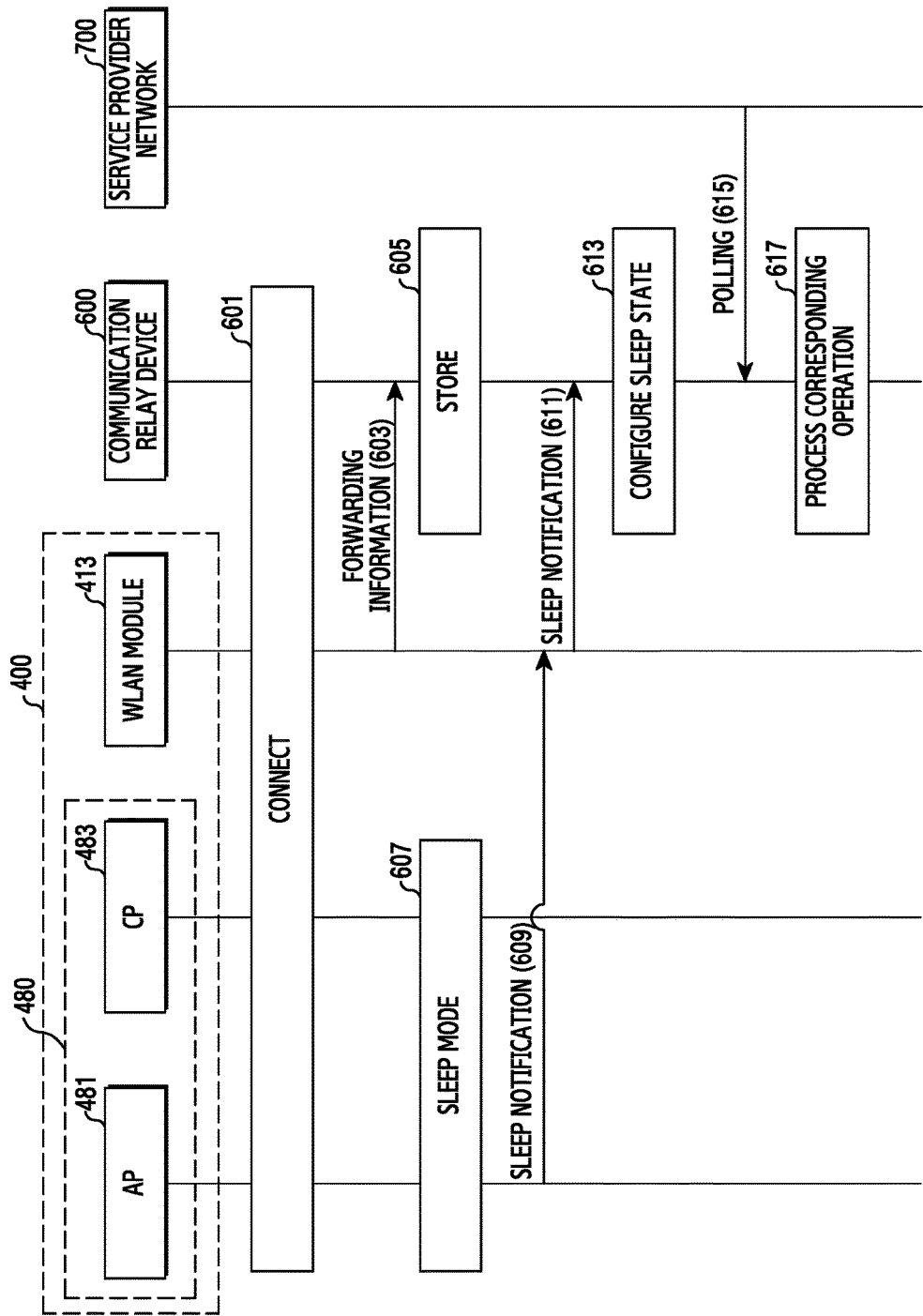
FIG. 6 is a sequence diagram illustrating an example operation of reducing power consumption of an electronic device.

FIG. 6 is a sequence diagram illustrating an example operation of reducing power consumption of the electronic device.

Referring to FIG. 6, in operation 601, the electronic device 400 may be connected to the communication relay device 600 (for example, the access point or the host device) based on a configured communication scheme (for example, WLAN or WPAN). For example, the electronic device 400 may control the WLAN module 413 to be turned on based on, for example, a user input (for example, an input using a menu configured to activate the WLAN module 413) for using the local area network. Alternatively, when the electronic device 400 enters a communication range of the communication relay device 600, the electronic device 400 may control the WLAN module 413 to be turned on in response to a signal broadcasted by the communication relay device 600. The electronic device 400 may search for a neighboring communication relay device (for example, the communication relay device 600) through the WLAN module 413 and may be connected to the found communication relay device 600 according to a general process.

In operation 603, the electronic device 400 may transfer forwarding information to the communication relay device 600 when the electronic device 400 is connected to the communication relay device 600. According to various example embodiments of the disclosure, the forwarding information may include, for example, identification information and channel information. The controller 480 (for example, the AP 481) of the electronic device 400 may be configured to transmit the forwarding information to the communication relay device 600 through the WLAN module 413.

In operation 605, the communication relay device 600 may receive the forwarding information transmitted by the electronic device 400 and store the received forwarding information in an internal memory or an external memory (for example, the memory 640 of FIG. 5A).

In operation 607, the electronic device 400 may enter the sleep mode. For example, the electronic device 400 may perform a particular operation (for example, an operation according to a user control) and, when the electronic device 400 is not used for a predetermined time, enter the sleep mode in which a currently driven hardware module (for example, the controller 480, the display 431, or the like) of the electronic device 400 switches to the sleep state. According to an example embodiment, when there is no user input in the electronic device 400 for a predetermined configured time, the display 431 may be controlled to be turned off by the controller 480 (for example, the AP 481) and, subsequently, the controller 480 (for example, the AP 481 and the CP 483) may determine to enter the sleep mode sequentially or in parallel. According to various example embodiments of the disclosure, when the electronic device 400 enters the sleep mode, the WLAN module 413 for communicating with the communication relay device 600 among the hardware modules of the electronic device 400 may maintain an on-state and the mobile communication module 411 for communicating with the mobile communication network may selectively switch to the sleep state.

In operations 609 and 611, when entering the sleep mode, the electronic device 400 may notify the communication relay device 600 of the entering of the sleep mode of the electronic device 400 through the WLAN module 413. According to various example embodiments of the disclosure, the notification of the entering of the sleep mode may be performed in parallel in the operation for determining the entering of the sleep mode and the electronic device 400 may completely switch to the sleep mode after the notification of the sleep mode. For example, the controller 480 (for example, the AP 481) of the electronic device 400 may transfer sleep information for notifying of the entering of the sleep mode to the WLAN module 431 in operation 609, and the WLAN module 413 may transmit the sleep information received from the AP 481 to the communication relay device 600 in operation 611.

In operation 613, the communication relay device 600 may receive the sleep information transmitted from the electronic device 400 (for example, the WLAN module 413) and configure the sleep state of the electronic device 400 based on the received sleep information. For example, the communication relay device 600 may configure (for example, configure the sleep state as enabled) and manage information (for example, the sleep information) for identifying that the electronic device 400 is in the sleep state in the forwarding information stored in the electronic device 400. The communication relay device 600 may determine whether to process the operation (hereinafter, referred to as an agent function) in the system timer of the electronic device 400 based on the sleep state configuration state (for example, enabled or disabled) According to an example embodiment, the communication relay device 600 may perform the agent function when the sleep state is configured (for example, the enabled state) and may not perform the agent function when the sleep state is not configured (for example, the disabled state).

In operation 615, the communication relay device 600 may periodically perform the paging operation with the service provider network 700 (for example, the mobile communication network) based on the forwarding information corresponding to the electronic device 400. For example, the service provider network 700 may perform a polling operation with respect to the electronic device 400 according to the configured system timer and the communication relay device 600 may intercept the data (for example, frame information) to be transmitted to the electronic device 400 according to the polled operation of the service provider network 700 to perform the agent function.

In operation 617, the communication relay device 600 may process the corresponding operation based on a result of the performance of the agent function. For example, when the communication relay device 600 determines that forwarding to the electronic device 400 is required based on the data of the service provider network 700 (for example, when an incoming call is generated), the communication relay device 600 may transmit the data and a control signal for waking up the electronic device 400 to the electronic device 400. Alternatively, when the communication relay device 600 determines that the forwarding to the electronic device 400 is not required based on the data of the service provider network 700 (for example, when there is no particular request), the communication relay device 600 may wait for reception of data corresponding to the next system timer.

According to various example embodiments of the disclosure, the communication relay device 600 may periodically perform the agent function according to the system timer until the electronic device 400 wakes up. For example, when the electronic device 400 wakes up, the electronic device 400 may notify the communication relay device 600 of the waking-up of the electronic device 400, and the communication relay device 600 may discontinue the performance of the agent function with respect to the electronic device 400 in response to the notification of the waking-up of the electronic device 400.

FIG. 6 illustrates an example of a case in which the communication relay device 600 is an access point and the electronic device 400 and the communication relay device 600 operate based on the local area network (for example, WLAN) according to various example embodiments of the disclosure. According to various example embodiments of the disclosure, the communication relay device 600 may be another electronic device (for example, the host device) and the electronic device 400 and the communication relay device 600 may operate based on the personal area network (for example, WPAN). According to an example embodiment, the electronic device 400 of FIG. 6 may replace the WLAN module 413 with the short range communication module 415 and may communicate with the communication relay device 600 based on the short range communication module 415.

Further, according to various example embodiments of the disclosure, the communication relay device 600 may be implemented by the access point and the host device according to a complex network environment (for example, WLAN and WPAN), and the electronic device 400 and the host device may operate based on the personal area network (for example, WPAN) and the host device and the access point may operate based on the local area network (for example, WLAN). According to an example embodiment, in FIG. 6, the electronic device 400 and the host device may communicate based on the short range communication module and the host device and the access point may communicate based on the WLAN module.

Figure 7:
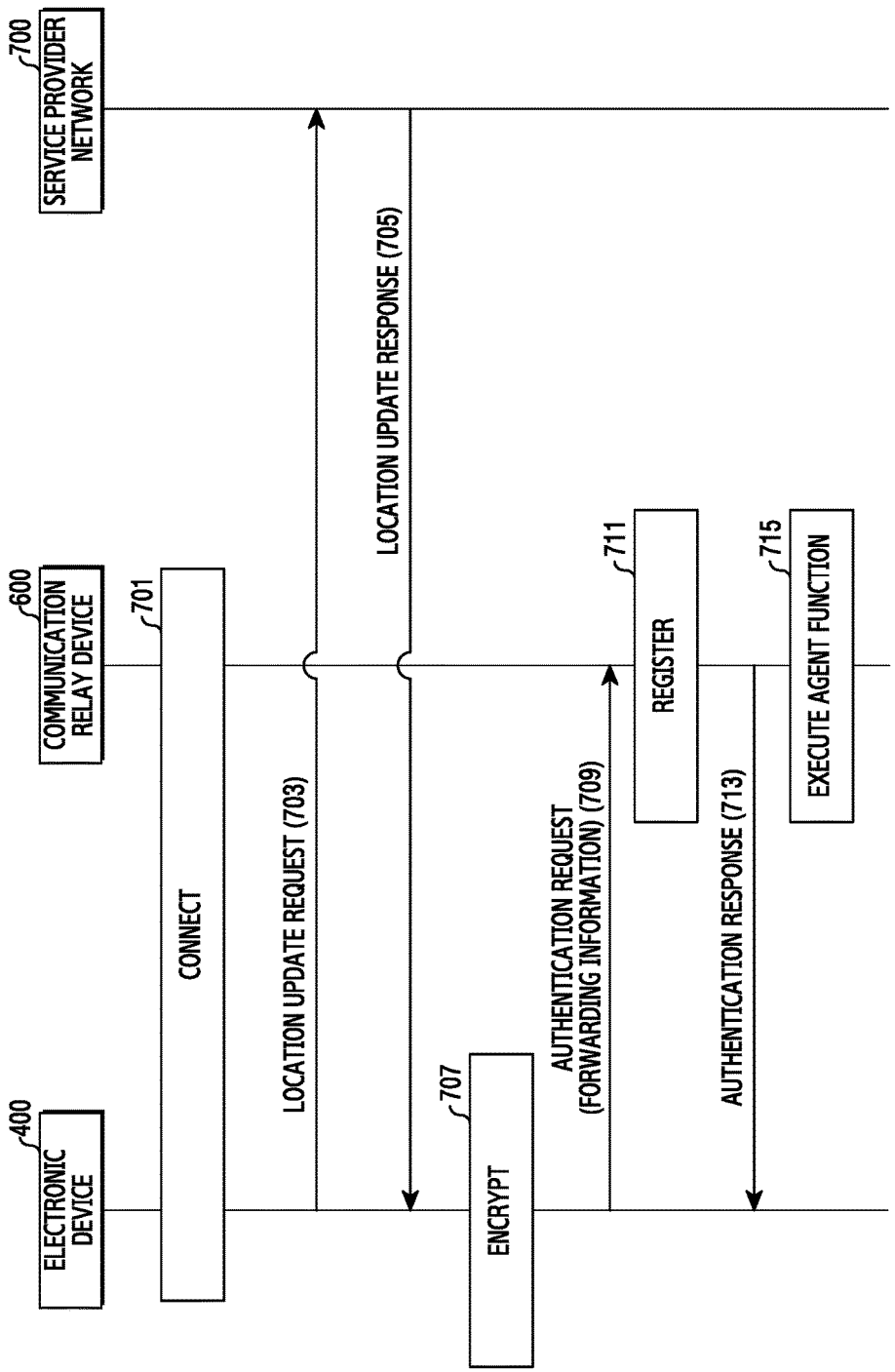
FIG. 7 is a sequence diagram illustrating an example operation of registering information of an electronic device in a communication relay device.

FIG. 7 is a sequence diagram illustrating an example operation of registering information on the electronic device in the communication relay device.

FIG. 7 illustrates a more detailed example of a process for registering forwarding information of the electronic device 400 in the communication relay device 600 (for example, operation 603 of FIG. 6).

Referring to FIG. 7, when the electronic device 400 enters a range of communication that can be supported by the communication relay device 600 and is connected to the communication relay device 600, the electronic device 400 may provide the communication relay device 600 with forwarding information including identification information and channel information stored in the electronic device 400 in operation 701. According to various example embodiments of the disclosure, the identification information and the channel information may include information which the service provider network 700 (for example, the mobile communication network) allocates to the electronic device 400, for example, information on TMSI, P-TMSI, IMSI, IMEI, and the like, and paging channel information allocated between the electronic device 400 and the service provider network 700. According to various example embodiments of the disclosure, the communication relay device 600 may provide the electronic device 400 with information on the communication relay device 600 (for example, identification information and location information on the communication relay device 600) in response to the reception of the forwarding information from the electronic device 400.

In operation 703, the electronic device 400 may perform a location update (LOC UPD) with the service provider network 700 to update the location information of the electronic device 400. For example, when the location update is performed, the electronic device 400 may insert the location information of the electronic device 400 into a location update request message for making a request for updating the location to the service provider network 700. The location update may be caused by the service provider network 700 or the electronic device 400. For example, the electronic device 400 may perform the location update for various reasons. According to various example embodiments of the disclosure, when the location update is performed, the electronic device 400 may insert the information received from the communication relay device 600 (for example, identification information and location information of the communication relay device 600) into the location update request message and transmit the location update request message to the service provider network 700.

Alternatively, although not illustrated in FIG. 7, the communication relay device 600 may directly perform the location update with the service provider network 700 through the mobile communication module (for example, the third mobile communication module 620) of the communication relay device 600 in response to the reception of the forwarding information from the electronic device 400 according to various example embodiments of the disclosure. For example, the communication relay device 600 may initiate the performance of the location update with the service provider network 700 based on channel information in the received forwarding information. When performing the location update, the communication relay device 600 may provide the service provider network 700 with information of the communication relay device 600 (for example, identification information and location information of the communication relay device 600) and the forwarding information (for example, identification and channel information) of the electronic device 400.

In operation 705, the service provider network 700 may perform the location update of the electronic device 400 in response to the location update request of the electronic device 400. For example, the service provider network 700 may process the location update of the electronic device 400 in response to the location update request message of the electronic device 400 and, when the location update is successful, transmit a location update response message corresponding to the location update request message to the electronic device 400. The location update response message may include identification information and channel information (for example, paging channel information) of the electronic device 400. According to various example embodiments of the disclosure, when processing the location update of the electronic device 400, the service provider network 700 may process the location update of the electronic device 400 using the information of the communication relay device 600 (for example, the identification information and the location information of the communication relay device 600) transmitted by the electronic device 400.

In operation 707, the electronic device 400 may encrypt the forwarding information including the identification information and the channel information received from the service provider network 700. For example, the electronic device 400 may encrypt the forwarding information through an encryption scheme of Public Key Infrastructure (PKI).

In operation 709, the electronic device 400 may transmit an authentication request (AUTH REQ) message including the encrypted forwarding information to the communication relay device 600. The encrypted forwarding information may include a key (for example, identification information for identifying the electronic device 400 (for example, TMSI, P-TMSI, IMSI, or IMEI)) received according to the performance of the location update and channel information (for example, paging channel information (for example, idle frame information)) for paging channel monitoring of the electronic device 400 by the communication relay device 600).

In operation 711, the communication relay device 600 may decrypt the forwarding information received from the electronic device 400 and register (e.g., store) the decrypted forwarding information. According to an example embodiment, the communication relay device 600 may store the forwarding information in an internal memory and, when previously stored forwarding information corresponding to the electronic device 400 exists, update the previously stored forwarding information based on the forwarding information.

In operation 713, the communication relay device 600 may transmit an authentication response (AUTH RESP) message corresponding to the authentication request message of the electronic device 400 to the electronic device 400. Thereafter, the electronic device 400 may enter the sleep mode and notify the communication relay device 600 of state switching due to the entry into the sleep mode.

In operation 715, the communication relay device 600 may perform the agent function based on the forwarding information in response to the notification of the state switching according to the entry of the electronic device 400 into the sleep mode. According to an example embodiment, the communication relay device 600 may monitor a paging channel with reference to the identification information and the channel information of the electronic device 400.

Figure 8:
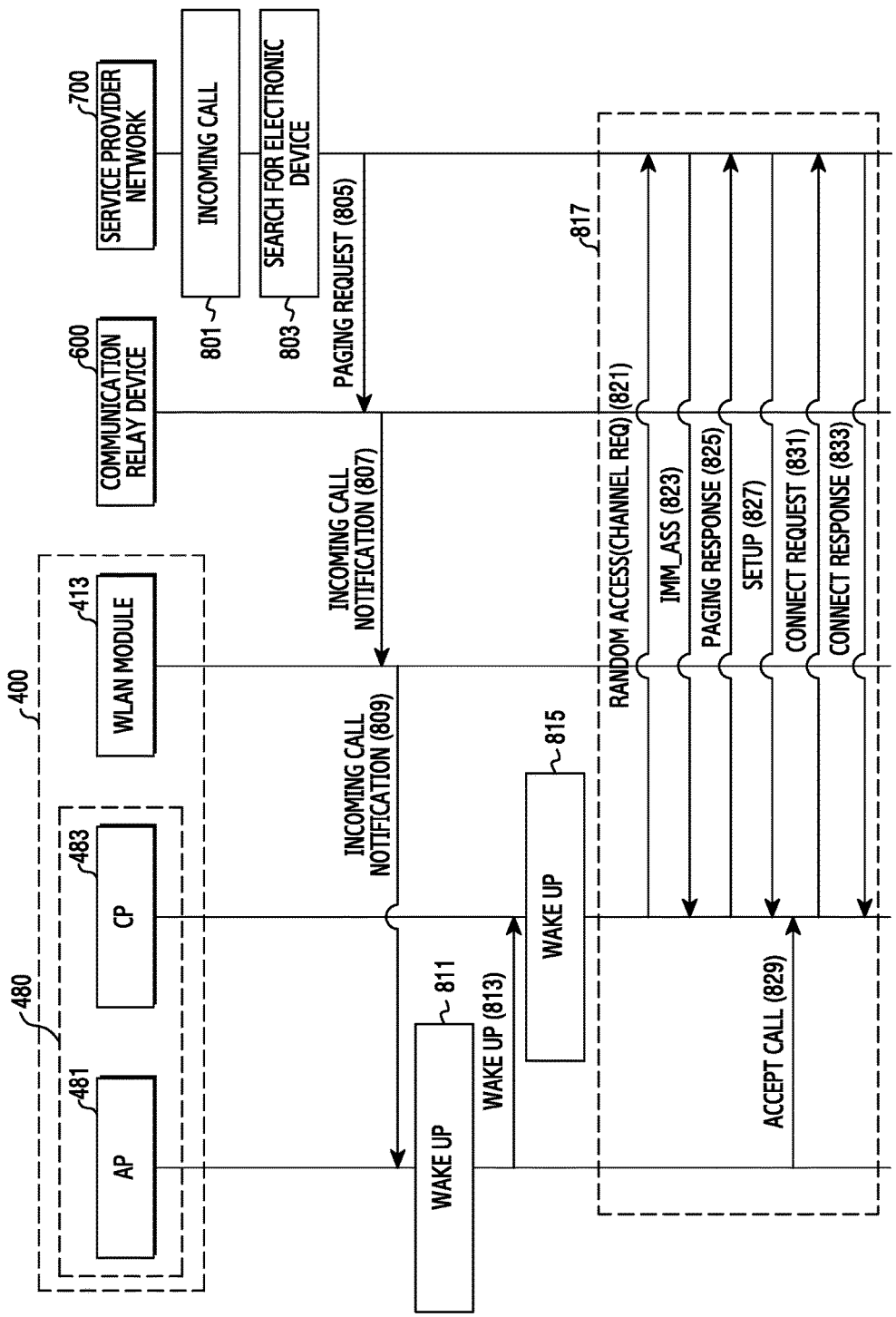
FIG. 8 is a sequence diagram illustrating an example operation for processing an incoming call in a system.

FIG. 8 is a sequence diagram illustrating an example operation for processing an incoming call in an example system.

FIG. 8 illustrates an example of a case where the electronic device 400 is in the sleep mode and waking-up of the electronic device 400 is required (for example, an incoming call of the electronic device 400 is detected) while the communication relay device 600 performs the agent function with respect to the electronic device 400. For example, FIG. 8 illustrates an example of an operation in which the communication relay device 600 is configured to control waking-up of the electronic device 400 in the sleep mode to allow the electronic device 400 to normally process an incoming call.

Referring to FIG. 8, when an incoming call is generated in operation 801, the service provider network 700 may search for the corresponding electronic device in operation 803. For example, the service provider network 700 may receive a request for a call connection to a terminating electronic device (for example, electronic device 400) from an originating electronic device. When the service provider network 700 detects the incoming call transmitted to the terminating electronic device as a destination (e.g., address) from the originating electronic device, the service provider network 700 may search for the terminating electronic device of the destination (e.g., address) based on location update-performed information (for example, location information of the electronic device) with the electronic devices or the communication relay device 600. According to an example embodiment, in the example of FIG. 8, the service provider network 700 may search for the electronic device 400 having information, which matches information of the terminating electronic device of the destination, in the electronic devices connected to the communication relay device 600 to identify the electronic device 400 to which the service provider is attempting to connect.

In operation 805, the service provider network 700 may transmit a paging request to the communication relay device 600. For example, the service provider network 700 may transmit, to the communication relay device 600 connected to the found electronic device 400, a notification of the incoming call transmitted to the electronic device 400 as the destination. According to an example embodiment, the service provider network 700 may compare the information of the terminating electronic device corresponding to the paging request of the originating electronic device with the information of the electronic device connected to the communication relay device 600 to determine whether the terminating electronic device of the destination according to the paging request corresponds to the electronic device 400 connected to the communication relay device 600, and transmit the paging notification to the communication relay device 600 connected to the electronic device 400. According to various example embodiments of the disclosure, the service provider network 700 may broadcast the paging by using the paging channel and, at this time, also broadcast information (for example, identification information) of the terminating electronic device, which is a destination (target) to form the paging (connect the call)

When the communication relay device 600 receives (or intercepts) the paging request from the service provider network 700, the communication relay device 600 may provide a notification of the incoming call to the corresponding electronic device 400 in operation 807. For example, the communication relay device 600 may receive the paging request broadcasted from the service provider network 700 through the mobile communication module (for example, the third mobile communication module 620 of FIG. 5A). According to an example embodiment, the communication relay device 600 may receive the paging request broadcast from the service provider network 700 through the third mobile communication module 620 while monitoring the paging channel by using forwarding information (for example, channel information) of the electronic devices stored (registered) in the memory (for example, the memory 640 of FIG. 5A). When the communication relay device 600 receives the paging request, the communication relay device 600 may search for the electronic device 400 using the forwarding information (for example, identification information) stored in the memory (for example, the memory 640 of FIG. 5A) of the communication relay device 600. When the electronic device 400 is found, the communication relay device 600 may forward the incoming call to the electronic device 400 through the WLAN module 413 (for example, the third WLAN module 610 of FIG. 5A). According to various example embodiments of the disclosure, the communication relay device 600 may forward the incoming call to the WLAN module 413 (for example, the first WLAN 511 module or the second WLAN module 531 of FIG. 5A) of the electronic device 400.

When the WLAN module 413 of the electronic device 400 receives the incoming call notification from the communication relay device 600, the WLAN module 413 may transmit the incoming call notification to the controller 480 (for example, the AP 481) in operation 809. For example, when the electronic device 400 receives the incoming call notification through the WLAN module 413, the WLAN module 413 may transmit a waking-up signal for waking up the AP 418 of the controller 480 and the incoming call notification to the AP 481 of the controller 480. According to various example embodiments of the disclosure, although the waking-up signal and the incoming call notification have been distinguished, the incoming call notification itself may act as the waking-up signal for waking up the AP 481.

In operations 811, 813, and 815, the controller 480 (for example, the AP 481 and the CP 483) of the electronic device 400 may wake up in response to the incoming call notification (or the waking-up signal). For example, the AP 481 of the controller 480 may wake up in response to the incoming call notification (or the waking-up signal) and may control waking-up of the CP 483 of the controller 480 in response to the waking-up. According to an example embodiment, the AP 481 of the controller 480 may transfer the incoming call notification (and/or the waking-up signal) to the CP 483, and the CP 483 of the controller 480 may wake up in response to the incoming call notification from the AP 481.

In operation 817, the controller 480 (for example, the CP 483) of the electronic device 400 may execute a general operation related to processing of the incoming call (for example, call connection) in response to the incoming call notification. For example, the controller 480 (for example, the CP 483) of the electronic device 400 may transmit feedback on the incoming call (for example, an alarm at least partially based on a display, sound, vibration, lamp, and the like) to the user after exchanging signaling for the call connection with the service provider network 700, and process the call connection in response to a user input (for example, acceptance or rejection).

According to an example embodiment, in operation 821, the controller 480 (for example, the CP 483) may transmit a random access request (for example, a channel request) through the mobile communication module 411 (for example, the first mobile communication module 513 or the second mobile communication module 533 of FIG. 5A) by using a Random Access Channel (RACH).

In operation 823, the service provider network 700 may transmit, to the electronic device 400 (for example, the controller 480 (for example, the CP 483)), a channel allocation message (for example, an IMMediate ASSignment (IMM_ASS) message) for allocating a channel to the electronic device 400 through an Access Grant Channel (AGCH) in response to the random access request (channel request) from the electronic device 400.

In operation 825, the controller 480 (for example, the CP 483) may transmit a paging response to the service provider network 700 in response to the channel allocation message from the service provider network 700.

In operation 827, the service provider network 700 may setup paging for the incoming call between the originating electronic device and the electronic device 400 in response to the paging response from the electronic device 400.

In operation 829, the controller 480 (for example, the AP 481) may transfer call acceptance to the CP 483 in response to, for example, a user input (for example, a call connection acceptance input). For example, the CP 483 of the controller 480 may notify of the paging setup to the AP 481 in response to the paging setup, and the AP 481 may transmit feedback (for example, alarm through at least one of display, vibration, sound, lamp, and the like) on information related to the incoming call to the user in response to the paging setup of the CP 483. The user may select and input acceptance or rejection of the incoming call in response to the feedback, and the AP 481 may receive the input selected by the user (for example, acceptance or rejection) and transfer an input signal (for example, an acceptance signal) corresponding to the corresponding user input (for example, the acceptance) to the CP 481.

The CP 483 of the controller 480 may transmit a connection request to the service provider network 700 in response to the input signal of the AP 481 in operation 831, and the service provider network 700 may transmit a connection response to the CP 483 of the controller 480 in operation 833. Through such a call connection process, the call connection may be made between the electronic device 400 and the originating electronic device.

Figure 9:
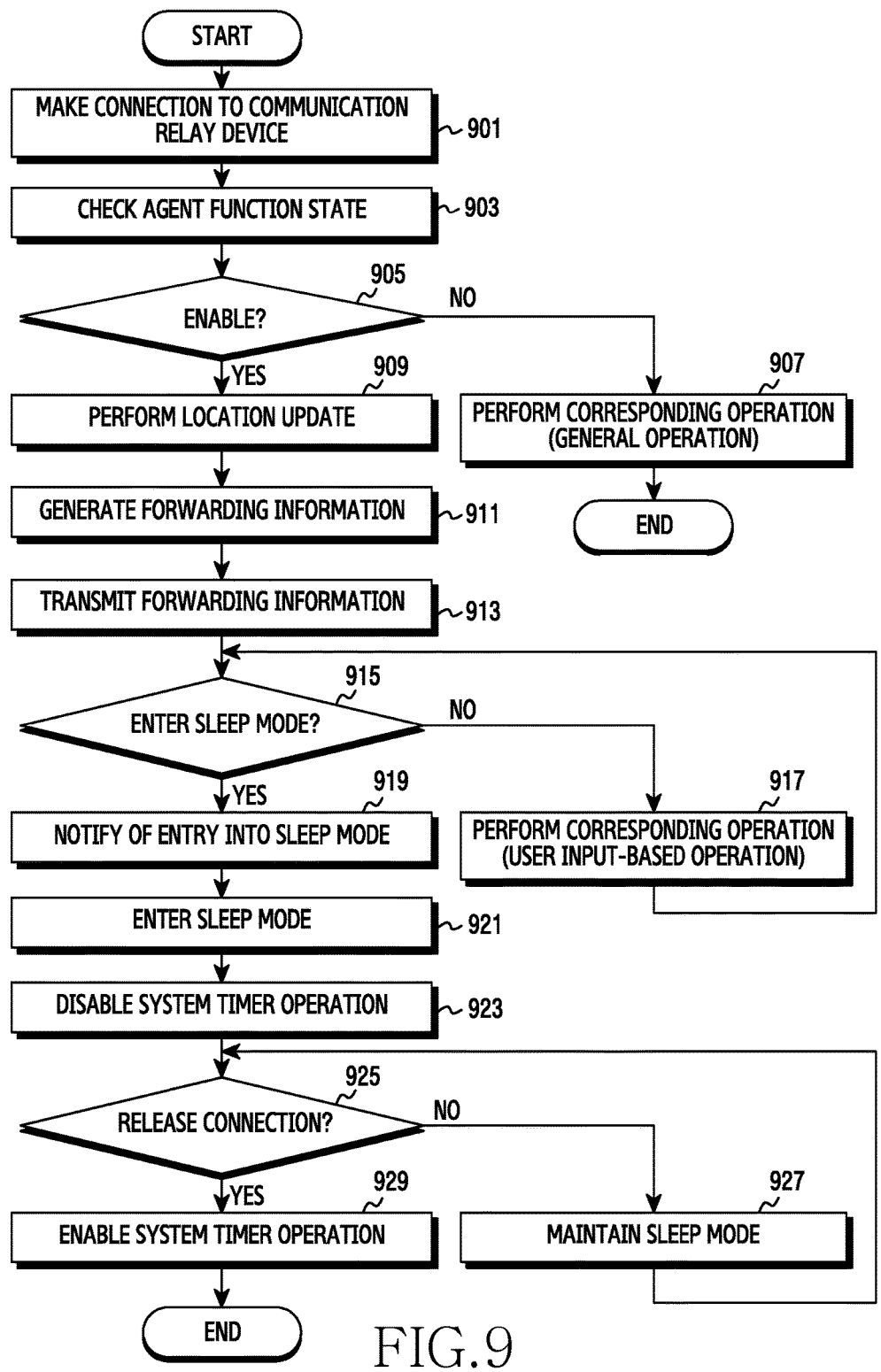
FIG. 9 is a flowchart illustrating an example operation for reducing power consumption of an electronic device.

FIG. 9 is a flowchart illustrating an example operation for reducing power consumption of the electronic device.

Referring to FIG. 9, in operation 901, the controller 480 may be connected to the communication relay device 600. For example, when the communication relay device 600 is found through the wireless communication module (for example, the WLAN module 413 or the short range communication module 415), the controller 480 may process an automatic connection or a manual connection by the user.

When the controller 480 is connected to the communication relay device 600, the controller 480 may check an agent function state in operation 903 and determine whether the agent function state is an enabled state or a disabled state in operation 905.

When it is determined that the agent function state is the disabled state in operation 905 (No of operation 905), the controller 480 may perform a corresponding operation in operation 907. For example, the controller 480 may perform a general operation of the electronic device 400 (for example, an operation based on a user input or a general power saving operation).

When it is determined that the agent function state is the enabled state in operation 905 (Yes of operation 905), the controller 480 may perform the location update in operation 909. For example, the controller 480 may report the location of the electronic device 400 to the service provider network 700 to perform the agent function by the communication relay device 600. According to various example embodiments of the disclosure, when the controller 480 performs the location update with the service provider network 700, the controller 480 may also report a location of the communication relay device 600 connected to the electronic device 400 as well as the location of the electronic device 400. According to various example embodiments of the disclosure, the performance of the location update is not limited to the sequence of operation 909, and may be performed before operation 909 (for example, the operation for connecting the communication relay device 600) or after operation 909 (for example, the operation for transmitting the forwarding information) in parallel or sequentially. According to various example embodiments, the location update of the electronic device 400 may be performed under various conditions such as when the electronic device 400 is connected to the communication relay device 600, when the electronic device 400 is disconnected from the communication relay device 600, when the electronic device 400 moves from one location area to another location area, after a predetermined regular time interval (cycle), and when the electronic device 400 switches from a sleep state to an active state.

In operation 911, the controller 480 may generate forwarding information. For example, the controller 480 may generate the forwarding information including identification information of the electronic device 400 and channel information for paging of the electronic device 400. According to various example embodiments of the disclosure, the forwarding information may be generated every time or may be pre-stored in the memory 450.

In operation 913, the controller 480 may transmit the forwarding information to the communication relay device 600. For example, the controller 480 (for example, the AP 481) may transmit the forwarding information to the WLAN module 610 of the communication relay device 600 (for example, the access point) through the WLAN module 413 in the WLAN environment.

According to various example embodiments, the controller 480 (for example, the AP 481) may transmit the forwarding information to the short range communication module (for example, the fourth short range communication module 850 of FIG. 5B) of the communication relay device 600 (for example, the host device) through the short range communication module 415 in the WPAN environment.

In operation 915, the controller 480 may determine whether the electronic device 400 enters the sleep mode. For example, the controller 480 (for example, the AP 481) may determine whether the electronic device 400 is operating (is being used) or has not operated (has not been used) for a predetermined time.

When it is determined that the electronic device 400 is not in a state for the entry into the sleep mode in operation 915 (No of operation 915), the controller 480 may process performance of a corresponding operation in operation 917. For example, the controller 480 may process an operation (function) based on a user input.

When it is determined that the electronic device 400 is in a state for the entry into the sleep mode in operation 915 (Yes of operation 915), the controller 480 may notify the communication relay device 600 of the entry of the electronic device 400 into the sleep mode in operation 919. For example, in a state where the agent function corresponds to the enabled state and the electronic device 400 is connected to the communication relay device 600, when the entry of the electronic device 400 into the sleep mode is determined, the controller 480 (for example, the AP 481) may transmit sleep information for notifying of the entry of the electronic device 400 into the sleep mode to the communication relay device 600.

In operation 921, the controller 480 may enter the sleep mode. For example, the controller 480 (for example, the AP 481) may switch a driving hardware module (for example, the display 431) of the electronic device 400 to a sleep state and the controller 480 (for example, the AP 481 and the CP 483) may be switched to the sleep state in parallel or sequentially.

In operation 923, the controller 480 may disable a system timer-related operation in response to the entry into the sleep mode. For example, the controller 480 may disable timer and count operations for waking-up (for example, periodic waking-up of the CP 483 of the controller 480) from the sleep mode every system timer cycle (for example, the DRX cycle). According to various example embodiments of the disclosure, operation 923 may be performed in parallel or sequentially in response to the entry into the sleep mode.

In operation 925, the controller 480 may detect a release of the connection with the communication relay device 600 in the sleep mode. For example, when the connection with the communication relay device 600 is released, the WLAN module 413 of the electronic device 400 may notify the controller 480 (for example, the AP 481) of the release of the connection with the communication relay device 600, and the controller 480 (for example, the AP 481) may wake up in response to the notification of the release of the connection of the WLAN module 413 and recognize the release of the connection. According to various example embodiments of the disclosure, the notification of the release of the connection may act as a waking-up signal for waking up the controller 480 (for example, the AP 481), or the waking-up signal may be provided separately from the notification of the release of the connection.

When the connection with the communication relay device 600 is not released in operation 925 (No of operation 925), the controller 480 may maintain the sleep mode in operation 927.

When the release of the connection with the communication relay device 600 is detected in operation 925 (Yes of operation 925), the controller 480 (for example, the AP 481) may enable the system timer-related operation in response to the release of the connection in operation 929. For example, when the notification of the release of the connection is transferred by the WLAN module 413, the controller 480 (the AP 481) may wake up and enable the timer and the count operation for waking up every system timer cycle in the sleep mode (for example, periodic waking-up of the CP 483 of the controller 480). According to an example embodiment, when the connection with the communication relay device 600 is released, the controller 480 may configure the agent function state to be disabled and perform the general sleep mode operation.

Figure 10:
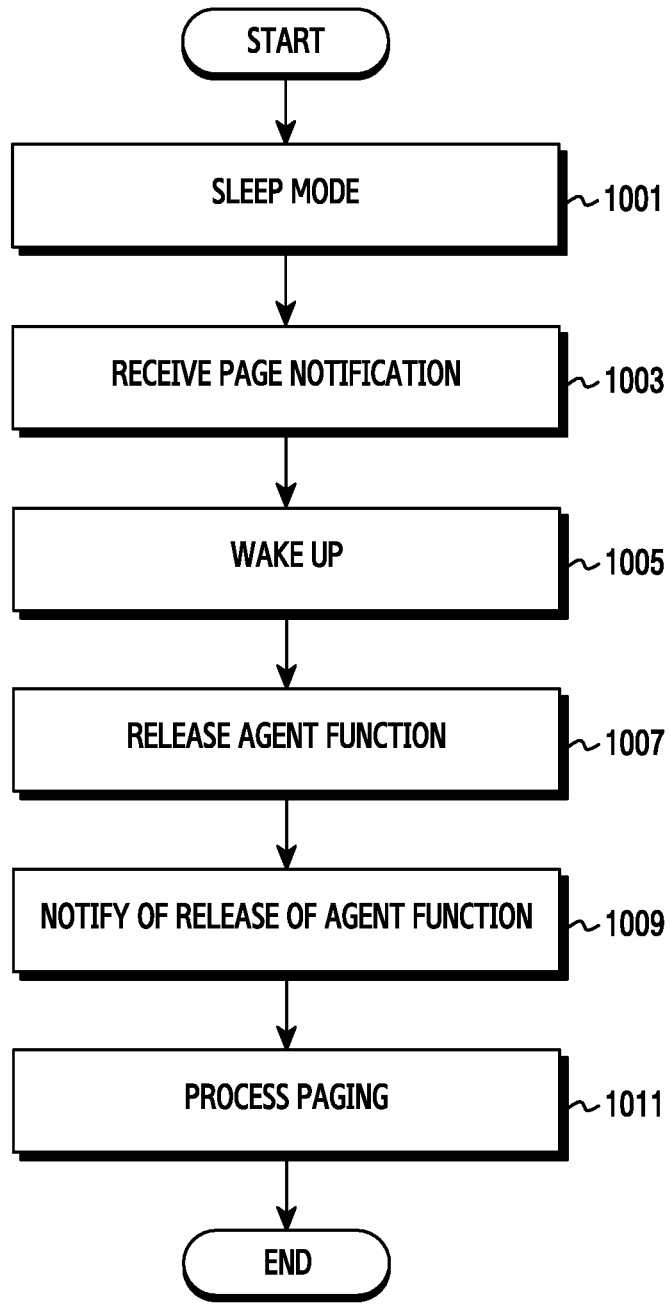
FIG. 10 is a flowchart illustrating an example of an operation in which the electronic device processes an incoming call.

FIG. 10 is a flowchart illustrating an example operation in which the electronic device processes an incoming call.

Referring to FIG. 10, in operation 1001, the electronic device 400 may be in the sleep mode. According to various example embodiments of the disclosure, the electronic device 400 may enter the sleep mode in a state where the agent function corresponds to the enabled state and the electronic device 400 is connected to the communication relay device 600 through the wireless communication module (for example, the WLAN module 413 or the short range communication module 415).

In operation 1003, the controller 480 may receive a paging notification in the sleep mode. For example, the controller 480 may receive the paging notification transmitted from the communication relay device 600 through the wireless communication module (for example, the WLAN module 413 or the short range communication module 415) corresponding to a communication scheme for the connection with the communication relay device 600. According to various example embodiments of the disclosure, the communication relay device 600 may receive the paging notification, which the service provider network 700 transmits to the electronic device 400 as a destination (address) during channel monitoring and transmit the received paging notification to the electronic device 400 through the wireless communication module (for example, the third WLAN module 610 or the fourth short range communication module 850) corresponding to a communication scheme for the connection with the electronic device 400.

In operation 1005, the controller 480 may wake up in response to the paging notification. For example, the WLAN module 413 of the electronic device 400 may transfer the paging notification to the AP 481 of the controller 480. The AP 481 of the controller 480 may wake up in response to the reception of the paging notification and wake up the CP 483 by transferring the paging notification to the CP 483 of the controller 480.

In operation 1007, the controller 480 may release the agent function being executed. For example, the controller 480 may configure the agent function to be disabled in response to the paging notification.

In operation 1009, the controller 480 may provide a notification of the release of the agent function to the communication relay device 600. For example, the controller 480 may transmit a notification to release the executed agent function with respect to the electronic device 400 to the communication relay device 600 in response to the release of the agent function with respect to the electronic device 400. The communication relay device 600 may release of the agent function with respect to the electronic device 400 in response to the notification of the release of the agent function.

In operation 1011, the controller 480 may perform paging processing in response to the paging notification. For example, the controller 480 may provide feedback corresponding to the paging notification to the user and accept or reject a paging connection in response to a user input.

Figure 11:
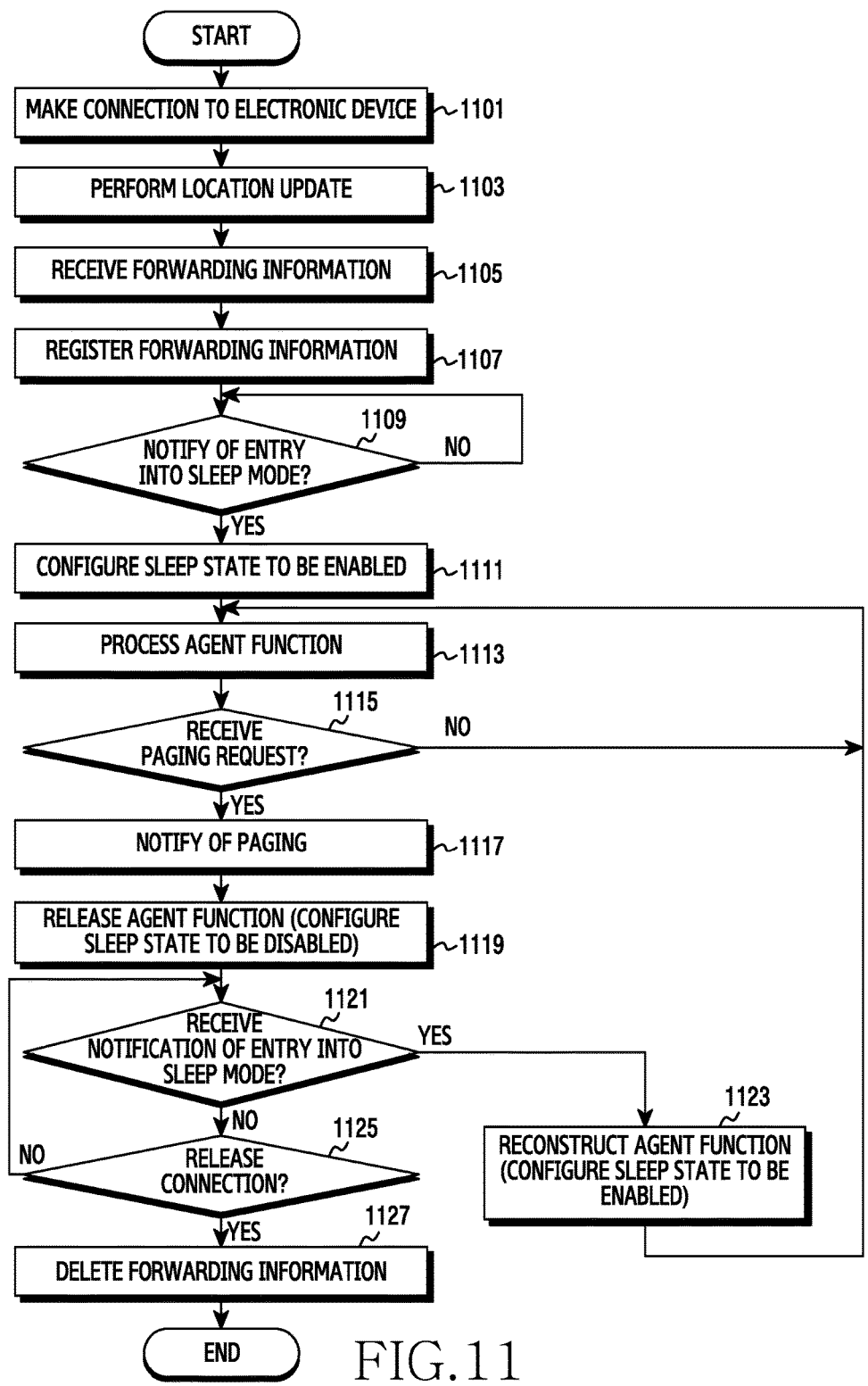
FIG. 11 is a flowchart illustrating an example operation in which a communication relay device supports reduction in power consumption of an electronic device.

FIG. 11 is a flowchart illustrating an example operation in which the communication relay device supports a reduction in power consumption of the electronic device.

Referring to FIG. 11, in operation 1101, the communication relay device 600 (for example, the third controller 630 of FIG. 5A or the fourth controller 830 of FIG. 5B) may be connected to the electronic device 400 through the wireless communication module (for example, the third WLAN module 610 of FIG. 5A or the fourth short range communication module 850 of FIG. 5B) corresponding to a communication scheme (for example, WLAN-based communication or WPAN-based communication) configured between the electronic device 400 and the communication relay device 600.

In operation 1103, the communication relay device 600 may perform a location update. For example, when the electronic device 400 is connected to the communication relay device 600, the third controller 630 of the communication relay device 600 may provide location information of the communication relay device 600 to the electronic device 400, and the electronic device 400 may perform the location update with the service provider network 700 by including the location information of the communication relay device 600. Additionally or alternatively, when the electronic device 400 is connected to the communication relay device 600, the third controller 630 of the communication relay device 600 may directly report the location of the communication relay device 600 to the service provider network 700 through the mobile communication module (for example, the third mobile communication module 620 or the fourth mobile communication module 820) for the performance of the agent function with respect to the electronic device 400. According to various example embodiments of the disclosure, the performance of the location update is not limited to the sequence of operation 1103, and the location update may be performed in an operation after operation 1103 (for example, operation 1107 for registering the forwarding information, operation 1111 for configuring the sleep state as enabled, or operation 1113 for processing the agent function) in parallel or sequentially. According to various example embodiments, the location update of the communication relay device 600 may be performed under various conditions such as when the electronic device 400 is connected to the communication relay device 600, when notification of the entry into the sleep state is received from the electronic device 400, and when processing of the agent function with respect to the electronic device is determined.

The communication relay device 600 may receive forwarding information from the connected electronic device 400 in operation 1105, and register the received forwarding information in the memory 640 of the communication relay device 600 in operation 1107.

In operation 1109, the communication relay device 600 may determine whether there is a notification of entry into the sleep mode from the connected electronic device 400.

When there is no notification of the entry into the sleep mode in operation 1109 (No of operation 1109), the communication relay device 600 may wait for the notification of the entry of the electronic device 400 into the sleep mode.

When the notification of the entry into the sleep mode is received in operation 1109 (Yes of operation 1109), the communication relay device 600 may configure the sleep state of the electronic device 400 to be enabled in operation 1111. For example, the communication relay device 600 may configure a state value indicating the sleep state in the forwarding information corresponding to the electronic device 400.

In operation 1113, the communication relay device 600 may process the agent function with respect to the electronic device 400. For example, the communication relay device 600 may perform the agent function based on the forwarding information in response to the notification of the entry of the electronic device 400 into the sleep mode. According to an example embodiment, the communication relay device 600 may monitor a paging channel with reference to identification information and channel information of the electronic device 400. The communication relay device 600 may perform a reception-related operation of the electronic device 400 according to the system timer with the service provider network 700 on behalf of the electronic device 400.

In operation 1115, the communication relay device 600 may determine whether a paging request for the electronic device 400 is received from the service provider network 700 while performing the channel monitoring corresponding to the electronic device 400.

When there is no reception of the paging request in operation 1115 (No of operation 1115), the communication relay device 600 may proceed to operation 1113 to perform the following operations.

When there is the reception of the paging request in operation 1115 (Yes of operation 1115), the communication relay device 600 may transmit a paging notification to the electronic device 400 in operation 1117. For example, the communication relay device 600 may forward the paging notification to the wireless communication module (for example, WLAN module 413 or the short range communication module 415) of the electronic device 400 through the wireless communication module (for example, the third WLAN module 610 or the fourth short range communication module 850).

In operation 1119, the communication relay device 600 may release the agent function with respect to the electronic device in response to the paging notification. For example, the communication relay device 600 may configure the sleep state of the electronic device 400 to be disabled in response to the paging notification for the electronic device 400. According to an example embodiment, the communication relay device 600 may configure a state value indicating the release of the sleep state (or active state) in the forwarding information corresponding to the electronic device 400. Additionally or alternatively, the release of the agent function may be performed in response to the paging notification which the communication relay device 600 transmits to the electronic device 400 and agent function release notification which the communication relay device receives from the electronic device 400 in response to the paging notification.

In operation 1121, the communication relay device 600 may determine whether there is the notification of the entry into the sleep mode from the electronic device 400.

When the notification of the entry into the sleep mode is received in operation 1121 (Yes of operation 1121), the communication relay device 600 may reconstruct the agent function with respect to the electronic device 400 in operation 1123. For example, the communication relay device 600 may configure the sleep state of the electronic device 400 to be enabled. According to an example embodiment, the communication relay device 600 may configure the state value indicating the sleep state in the forwarding information corresponding to the electronic device 400.

When there is no notification of the entry into the sleep mode in operation 1121 (No of operation 1121), the communication relay device 600 may determine whether the connection with the electronic device 400 is released. For example, the communication relay device 600 may detect the release of the connection when the electronic device 400 escapes from a supportable range of the communication relay device 600, or the connection may be forcibly released by the electronic device 400.

When there is no release of the connection in operation 1125 (No of operation 1125), the communication relay device 600 may proceed to operation 1121 to perform the following operations.

Where the release of the connection is detected in operation 1125 (Yes of operation 1125), the communication relay device 600 may delete the forwarding information corresponding to the electronic device 400, which is stored in the memory 640. According to various example embodiments of the disclosure, operation 1127 for deleting the forwarding information may be selectively performed. The forwarding information may be continuously stored in the memory 640 of the communication relay device 600 and may be deleted in response to a deletion request from the electronic device 400.

Figure 12:
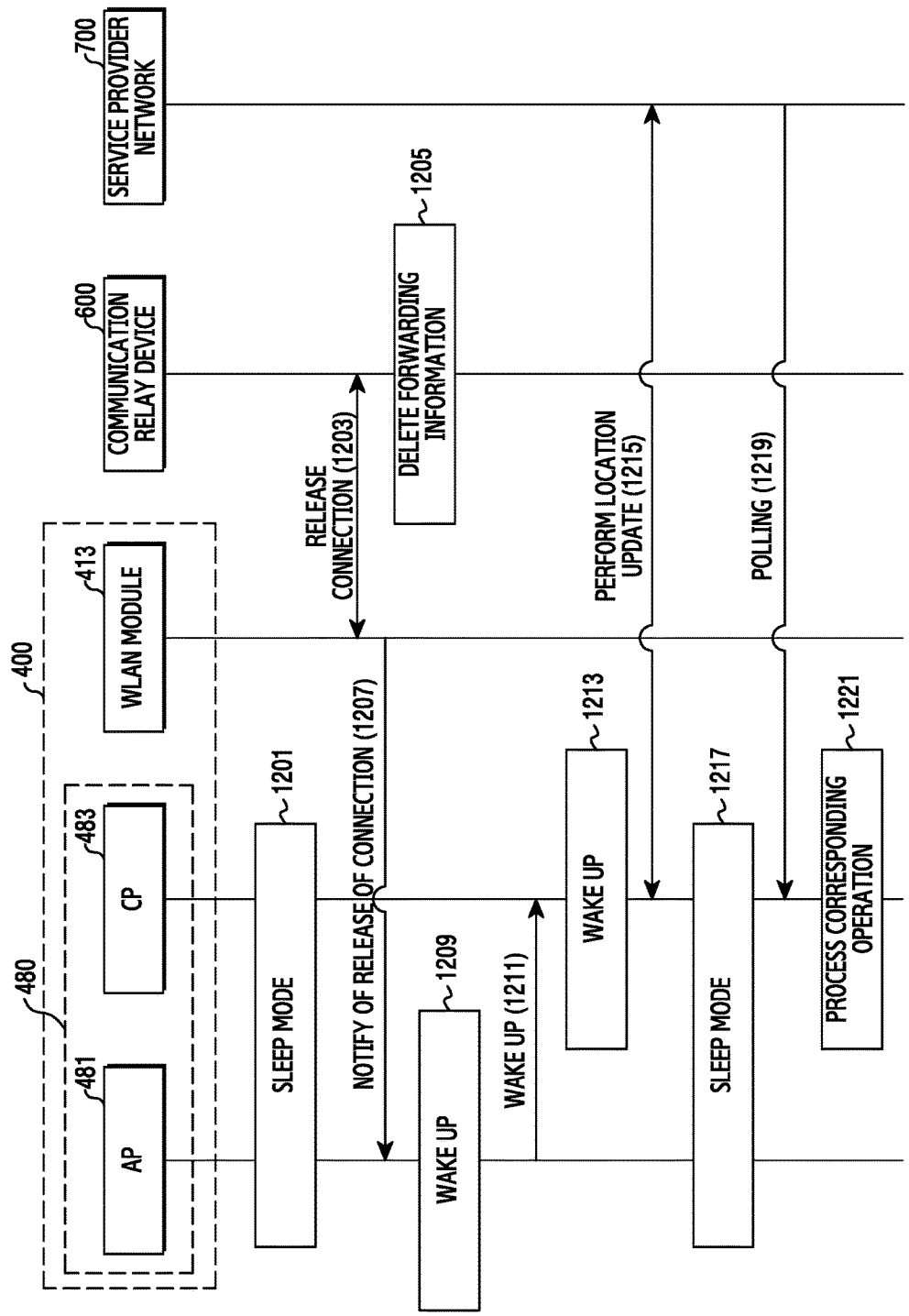
FIG. 12 is a sequence diagram illustrating an example operation for switching a control between an electronic device and a communication relay device.

FIG. 12 is a sequence diagram illustrating an example operation for switching a control right between the electronic device and the communication relay device.

FIG. 12 illustrates an example of an operation for, when the connection between the electronic device 400 and the communication relay device 600 is released, switching the electronic device 400 to perform the paging channel monitoring (for example, the electronic device 400 is returned (that is, the subject switches from the communication relay device 600 to the electronic device 400)).

Referring to FIG. 12, in operation 1201, the controller 480 (for example, the AP 481 or the CP 483) of the electronic device 400 may be in the sleep mode.

When the connection between the communication relay device 600 and the WLAN module 413 of the electronic device 400 is released in operation 1203, the communication relay device 600 may delete forwarding information corresponding to the electronic device 400 in operation 1205.

When the connection between the communication relay device 600 and the WLAN module 413 of the electronic device 400 is released, the WLAN module 413 may transfer a connection release notification according to the release of the connection with the communication relay device 600 to the controller 480 (for example, the AP 481) in operation 1207.

In operations 1209, 1211, and 1213, the controller 480 (for example, the AP 481 or the CP 483) of the electronic device 400 may wake up in response to the connection release notification of the WLAN module 413. For example, the AP 481 of the controller 480 may wake up in response to the connection release notification of the WLAN module 413 and control waking-up of the CP 483 of the controller 480 in response to the waking-up. According to an example embodiment, the AP 481 of the controller 480 may transfer the connection release notification (and/or the waking-up signal) to the CP 483, and the CP 483 of the controller 480 may wake up in response to the control of the waking-up by the AP 481. According to various example embodiments of the disclosure, the AP 481 of the controller 480 may directly enter the sleep mode in parallel or sequentially at a time point when the CP 483 is woken up, or enter the sleep mode in parallel or sequentially at a time point when the CP 483 enters the sleep mode in operation 1217.

In operation 1215, the controller 480 (for example, the CP 483) of the electronic device 400 may perform a location update with the service provider network 700 through the mobile communication module 411 in response to the connection release notification.

When the location update is completed, the controller 480 (for example, the AP 481 or the CP 483) of the electronic device 400 may enter the sleep mode in operation 1217. For example, the CP 483 of the controller 480 may determine to enter the sleep mode in response to the completion of the location update with the service provider network 700, and the AP 481 of the controller 480 may enter the sleep mode in response to the entry of the CP 483 into the sleep mode or automatically enter the sleep mode when a predetermined time passes after the waking-up of the CP 483 is processed. According to various example embodiments of the disclosure, the CP 483 of the controller 480 may wait for reception of data according to the system timer (for example, DRX cycle) with the service provider network 700 after entering the sleep mode.

The service provider network 700 may periodically perform a polling operation with respect to the electronic device 400 according to the configured system timer (for example, DRX cycle) in operation 1219, and the controller 480 (for example, the CP 483) of the electronic device 400 may periodically wake up according to the system timer to check for the reception of the data from the service provider network 700 in operation 1221. According to an example embodiment, the controller 480 (for example, the CP 483) may monitoring a paging channel every system timer cycle and check whether there is the reception of data such as an incoming call or the like.

FIG. 12 illustrates an example of a case where the communication relay device 600 is the access point and the electronic device 400 and the communication relay device 600 operate based on the local area network (for example, WLAN) according to various example embodiments of the disclosure. According to various example embodiments of the disclosure, the communication relay device 600 may be another electronic device (for example, the host device) and the electronic device 400 and the communication relay device 600 may operate based on the personal area network (for example, WPAN). According to an example embodiment, in FIG. 12, the electronic device 400 may replace the WLAN module 413 with the short range communication module 415, and may be connected to or disconnected from the communication relay device 600 based on the short range communication module 415. The operation of FIG. 12 may be performed according to the above description.

Further, according to various example embodiments of the disclosure, the communication relay device 600 may be implemented by the access point and the host device according to a complex network environment (for example, WLAN and WPAN), and the electronic device 400 and the host device may operate based on the personal area network (for example, WPAN) and the host device and the access point may operate based on the local area network (for example, WLAN). According to an example embodiment, in FIG. 12, the electronic device 400 and the host device may be connected to or disconnected from each other based on the short range communication module and the host device and the access point may be connected to or disconnected from each other based on the WLAN module.

As described above, a method of reducing power consumption of the electronic device 400 according to various example embodiments of the disclosure may include an operation of making a connection with the communication relay device 600, an operation of transmitting forwarding information to the communication relay device 600 in response to the connection with the communication relay device 600, an operation of entering the sleep mode, an operation of waking up from the sleep mode according to a control of the communication relay device 600, and an operation of processing paging in response to the waking-up. According to various example embodiments of the disclosure, when the electronic device 400 is in the sleep mode, the electronic device 400 may maintain the sleep mode according to the system timer cycle. When the paging of the service provider network 700 is transferred from the communication relay device 600, the electronic device 400 may wake up from the sleep mode.

As described above, a method of supporting a reduction in power consumption of the electronic device 400 by the communication relay device 600 according to various example embodiments of the disclosure may include an operation of receiving forwarding information from the connected electronic device 400 and storing the received forwarding information, an operation of performing channel monitoring of the electronic device 400 based on the forwarding information in response to a notification of entry of the electronic device 400 into the sleep mode, and an operation of controlling waking-up of the electronic device 400 when paging corresponding to the electronic device 400 is detected. According to various example embodiments of the disclosure, the communication relay device 600 may perform channel monitoring according to a system timer of the electronic device 400, detect paging transmitted to the electronic device 400 as a destination from the service provider network 700 according to the channel monitoring, and forward the paging to the electronic device 400 through the wireless communication module (for example, the third WLAN module 610 or the fourth short range communication module 850).

As described above, a method of supporting a reduction in power consumption of the electronic device 400 according to various example embodiments of the disclosure may include an operation of making a connection between the electronic device 400 and the communication relay device 600, an operation of transmitting forwarding information to the communication relay device 600 in response to the connection with the communication relay device 600 by the electronic device 400, notifying of entry into the sleep mode to the communication relay device 600 and entering the sleep mode by the electronic device 400, an operation of performing channel monitoring for the electronic device 400 in response to the notification of entry of the electronic device 400 into the sleep mode by the communication relay device 600, an operation of waking up the electronic device 400 when paging corresponding to the electronic device 400 is detected by the communication relay device 600, and an operation of processing the paging in response to the waking-up of the communication relay device 600 by the electronic device 400.

An electronic device and an operation method thereof according to various example embodiments of the disclosure may allow the communication relay device (for example, the Access Point (AP) or the host device), to which the electronic device is connected, to perform an operation of the electronic device corresponding to periodically waking up from the sleep mode according to the system timer cycle to perform the channel monitoring on behalf of the electronic device. Accordingly, the electronic device may continuously maintain the sleep mode before the generation of the paging from the network and, as a result, unnecessary power consumption in the sleep mode can be reduced.

According to various example embodiments of the disclosure, when the electronic device exists in a place (or region) connected to the communication relay device, a channel monitoring-related operation of the electronic device according to the system timer can be processed by the communication relay device on behalf of the electronic device. Further, when the paging for the electronic device is generated according to the channel monitoring, the communication relay device may notify of the waking-up of the electronic device and the paging. Accordingly, various example embodiments of the disclosure may provide a continuous service without disconnection of communication while extending a use time of the electronic device by reducing power consumption of the electronic device in the sleep mode.

According to various example embodiments of the disclosure, the electronic device does not need to wake up from the sleep mode in places (for example, places such as an office, home, public place, and the like where wireless communication through a connection with the communication relay device is possible) where the electronic device can be connected to the communication relay device, and may reduce and/or minimize current consumption of a battery without a communication disconnection as the communication relay device continuously performs the corresponding operation.

According to various example embodiments of the disclosure, an environment to reduce power consumption of the electronic device is implemented and thus the user convenience can be improved and usability, convenience, accessibility, and competitiveness of the electronic device can be improved.

The embodiments of the disclosure disclosed herein and illustrated in the drawings are merely examples presented in order to easily describe technical details of the disclosure and to aid in understanding of the disclosure, and are not intended to limit the scope of the disclosure. Therefore, it should be understood that, in addition to the example embodiments disclosed herein, all modifications and changes or modified and changed forms derived from the disclosure fall within the scope of the disclosure.

What is claimed is:
1. An electronic device comprising:
a wireless communication circuitry;
a mobile communication circuitry; and
a processor operably connected to the wireless communication circuitry and the mobile communication circuitry,
wherein the processor is configured to:
connect with a communication relay device via the wireless communication circuitry, notify an entry into a sleep mode to the communication relay device to perform channel monitoring while entering the sleep mode, disable a system timer used to perform channel monitoring by the electronic device, in the sleep mode, wake up from the sleep mode when data of a service provider network is forwarded from the communication relay device to the electronic device, and process an operation related to the data of the service provider network via the mobile communication circuitry.

2. The electronic device of claim 1, wherein the processor is configured further to:

transmit forwarding information of the electronic device to the communication relay device via the wireless communication circuitry when the electronic device is connected to the communication relay device, wherein the forwarding information includes identification information for identifying the electronic device and channel information for channel monitoring.

3. The electronic device of claim 1, wherein the system time corresponds to a Discontinuous Receiption (DRX) cycle.

4. The electronic device of claim 1, wherein the processor includes an Application Processor (AP) and a Communication Processor (CP), and wherein the AP is configured to:

receive the data transferred from the communication relay device through the wireless communication circuitry while the AP and the CP of the processor are in the sleep mode, wake up in response to the data, and wake up the CP.

5. The electronic device of claim 1, wherein the wireless communication circuitry includes at least one of: a WLAN circuitry configured to perform communication based on a local area network, and a short range communication circuitry configured to perform communication based on a personal area network.

6. A communication relay device comprising:

a wireless communication circuitry a mobile communication circuitry; and a processor operably connected to the wireless communication circuitry and the mobile communication circuitry, wherein the processor is configured to:

connect with an electronic device via the wireless communication circuitry, receive forwarding information of the electronic device via the wireless communication circuitry, register the forwarding information of the electronic device, receive information associated with an entry into a sleep mode from the electronic device that enters the sleep mode, and perform channel monitoring corresponding to the electronic device based on the forwarding information while the electronic device is in the sleep mode a system timer of the electronic device being disabled when the electronic device enter the sleep mode.

7. The communication relay device of claim 6, wherein the processor is configured to:

perform the channel monitoring via the mobile communication circuitry based on the system timer corresponding to the electronic device, detect data transmitted to the electronic device as a destination from the service provider network based on the channel monitoring, forward the data to the electronic device via the wireless communication circuitry, stop the channel monitoring in response to the forwarding of the data, and remove the forwarding information from the communication relay device in response to a release of the connection with the electronic device.

8. The communication relay device of claim 7, wherein the processor is configured to:

enable a sleep state of the electronic device whose forwarding information has been registered in the communication relay device when the electronic device enters the sleep mode, and reconstruct the channel monitoring when the electronic device enters the sleep mode after the channel monitoring is stopped.

9. The communication relay device of claim 6, wherein the communication relay device includes at least one of: an access point supporting communication based on a local area network, and a host device supporting communication based on a personal area network, and wherein the wireless communication circuitry includes at least one of a WLAN circuitry configured to perform communication based on the local area network, and a short range communication circuitry configured to perform communication based on the personal area network.

10. A method of operating an electronic device, the method comprising:

connecting with a communication relay device via a wireless communication circuitry of the electronic device, notifying an entry into a sleep mode to the communication relay device to perform channel monitoring while entering the sleep mode, disabling a system timer used to perform channel monitoring by the electronic device, in the sleep mode, waking up from the sleep mode when data of a service provider network is forwarded from the communication relay device to the electronic device, and processing an operation related to the data of the service provider network via a mobile communication circuitry of the electronic device.

11. The method of claim 10, further comprising:

transmitting forwarding information of the electronic device to the communication relay device via the wireless communication circuitry when the electronic device is connected to the communication relay device, wherein the forwarding information includes identification information for identifying the electronic device and channel information for channel monitoring.

12. The method of claim 10, wherein the system timer corresponds to a Discontinuous Reception (DRX) cycle.

13. The method of claim 10, wherein waking up from the sleep mode comprises:

when the data is transferred from the communication relay device through the wireless communication circuitry while an Application Processor (AP) and an Communication Processor (CP) of the electronic device are in the sleep mode, waking up the AP, and waking up the CP by the AP.

14. The method of claim 10, wherein the wireless communication circuitry includes at least one of: a WLAN circuitry configured to perform communication based on a local area network, and a short range communication circuitry configured to perform communication based on a personal area network.

15. A method of operating a communication relay device, the method comprising:
   connecting with an electronic device via a wireless communication circuitry of the communication relay device,
   receiving forwarding information of the electronic device via the wireless communication circuitry,
   registering the forwarding information of the electronic device,
   receiving information associated with an entry into a sleep mode from the electronic device that enters the sleep mode, and
   performing channel monitoring corresponding to the electronic device based on the forwarding information while the electronic device is in the sleep mode, a system timer of the electronic device being disabled when the electronic device enters the sleep mode.

16. The method of claim 15, wherein the performing of the channel monitoring corresponding to the electronic device comprises:
   performing the channel monitoring via the mobile communication circuitry based on the system timer corresponding to the electronic device,
   detecting data transmitted to the electronic device as a destination from the service provider network based on the channel monitoring,
   forwarding the data to the electronic device via the wireless communication circuitry,
   stopping the channel monitoring in response to the forwarding of the data, and
   removing the forwarding information from the communication relay device in response to a release of the connection with the electronic device.

17. The method of claim 16, further comprising:
   enabling a sleep state of the electronic device whose forwarding information has been registered in the communication relay device when the electronic device enters the sleep mode, and
   reconstructing the channel monitoring when the electronic device enters the sleep mode after the channel monitoring is stopped.

18. The method of claim 15, wherein the communication relay device includes at least one of: an access point supporting communication based on a local area network, and a host device supporting communication based on a personal area network, and
   wherein the wireless communication circuitry includes at least one of a WLAN circuitry configured to perform communication based on the local area network, and a short range communication circuitry configured to perform communication based on the personal area network.

* * * * *